US010825168B2

(12) United States Patent
Tegzes et al.

(10) Patent No.: US 10,825,168 B2
(45) Date of Patent: Nov. 3, 2020

(54) AUTOMATED ORGAN RISK SEGMENTATION MACHINE LEARNING METHODS AND SYSTEMS

(71) Applicant: General Electric Company, Schenectady, NY (US)

(72) Inventors: Pal Tegzes, Budapest (HU); Attila Radics, Budapest (HU); Eszter Csernai, Budapest (HU); Laszlo Rusko, Szeged (HU)

(73) Assignee: General Electric Company, Schenectady, NY (US)

(*) Notice: Subject to any disclaimer, the term of this patent is extended or adjusted under 35 U.S.C. 154(b) by 249 days.

(21) Appl. No.: 15/958,546

(22) Filed: Apr. 20, 2018

(65) Prior Publication Data

US 2018/0315188 A1  Nov. 1, 2018

Related U.S. Application Data

(60) Provisional application No. 62/488,442, filed on Apr. 21, 2017.

(51) Int. Cl.
*G06T 7/00* (2017.01)
*G06T 7/11* (2017.01)
*G06K 9/20* (2006.01)

(52) U.S. Cl.
CPC .......... *G06T 7/0012* (2013.01); *G06K 9/2054* (2013.01); *G06T 7/11* (2017.01); *G06T 2207/10081* (2013.01); *G06T 2207/20084* (2013.01); *G06T 2207/30004* (2013.01)

(58) Field of Classification Search
CPC ............. G06T 7/0012; G06T 7/11; G06T 2207/30004; G06T 2207/20084; G06T 2207/10081; G06K 9/2054
See application file for complete search history.

(56) References Cited

U.S. PATENT DOCUMENTS

| 2017/0200067 A1* | 7/2017 | Zhou | G06T 7/143 |
| 2017/0213339 A1* | 7/2017 | Hibbard | G06T 7/38 |
| 2018/0165808 A1* | 6/2018 | Bagci | G06T 7/00 |
| 2019/0114510 A1* | 4/2019 | Bremer | G06N 3/0454 |

(Continued)

OTHER PUBLICATIONS

Li et al., "Highly Efficient Forward and Backward Propagation of Convolutional Neural Networks for Pixelwise Classification," Dec. 16, 2014, 10 pages.

(Continued)

*Primary Examiner* — Yon J Couso
(74) *Attorney, Agent, or Firm* — Hanley, Flight and Zimmerman, LLC

(57) ABSTRACT

Certain examples provide an image data processing system including an anatomy detector to detect an anatomy in an image and to remove items not included in the anatomy from the image. The example system includes a bounding box generator to generate a bounding box around a region of interest in the anatomy. The example system includes a voxel-level segmenter to classify image data within the bounding box at the voxel level to identify an object in the region of interest. The example system includes an output imager to output an indication of the object identified in the region of interest segmented in the image.

15 Claims, 32 Drawing Sheets

(56) References Cited

U.S. PATENT DOCUMENTS

2019/0237186 A1* 8/2019 El-Baz .................. A61B 5/201

OTHER PUBLICATIONS

Brébisson et al, "Deep Neural Networks for Anatomical Brain Segmentation," Jun. 25, 2015, 9 pages.
Ioffe et al., "Batch Normalization: Accelerating Deep Network Training by Reducing Internal Covariate Shift," Mar. 2, 2015, 11 pages.
Noh et al., "Learning Deconvolution Network for Semantic Segmentation," May 17, 2015, 10 pages.
Kendall et al., "Bayesian SegNet: Model Uncertainty in Deep Convolutional Encoder-Decoder Architectures for Scene Understanding," Oct. 10, 2016, 11 pages.
Yu et al., "Multi-Scale Context Aggregation by Dilated Convolutions," Apr. 30, 2016, 13 pages.
Milletari et al., "Hough—CNN: Deep Learning for Segmentation of Deep Brain Regions in MRI and Ultrasound," Jan. 31, 2016, 34 pages.
Moeskops et al., "Automatic segmentation of MR brain images with a convolutional neural network," Apr. 11, 2017, 11 pages.
Raudaschl et al.,"Head and Neck Auto Segmentation Challenge," 2015 MICCAI Challenge, retrieved from the internet from http://www.imagenglab.com/wiki/mediawiki/index.php?title=2015_MICCAI_Challenge on Apr. 20, 2018, 3 pages.
"Convolution in Caffe: a memo," GitHub, Inc, Retrieved from the internet from https://github.com/Yangqing/caffe/wiki/Convolution-in-Caffe:-a-memo on Apr. 20, 2018, 2 pages.
De Vos, B. D., et al., "ConvNet-Based Localization of Anatomical Structures in 3D Medical Images," IEEE Transactions on Medical Imaging, vol. 36, Issue 7, pp. 1470-1481 (Feb. 23, 2017).
Goel, N., et al., "Medical Image Processing: a Review," Second International Innovative Applications of Computational Intelligence on Power, Energy and Controls With Their Impact on Humanity(CIPECH), IEEE, pp. 57-62 (Nov. 18, 2016).
Moghimi, M., et al., "Boosted Convolutional Neural Networks," Procedings of the British Machine Vision Conference, pp. 1-13 (Jan. 1, 2016).
Rajchl, M., et al., "DeepCut: Object Segmentation From Bounding Box Annotations Using Convolutional Neural Networks," IEEE Transactions on Medical Imaging, vol. 36, Issue 2, pp. 674-683 (Nov. 9, 2016).
Zhu, Y-M., et al., "Automatic Patient Table Removal in CT Images," Journal of Digital Imaging, vol. 25, Issue 4, pp. 480-485 (Jan. 19, 2012).
Extended European Search Report and Opinion issued in connection with corresponding EP Application No. 18168328.5 dated Jul. 20, 2018.

* cited by examiner

| X_LOW | X_HIGH | Y_LOW | Y_HIGH | Z_LOW | Z_HIGH | X_LOW MM | X_HIGH MM | Y_LOW MM | Y_HIGH MM | Z_LOW MM | Z_HIGH MM |
|---|---|---|---|---|---|---|---|---|---|---|---|
| 107 | 396 | 88 | 466 | 80 | 395 | 45.3 | 167.8 | 37.3 | 197.5 | 30.0 | 148.1 |

EXAMPLE BOUNDING BOX DETECTION OUTPUT

FIG. 21

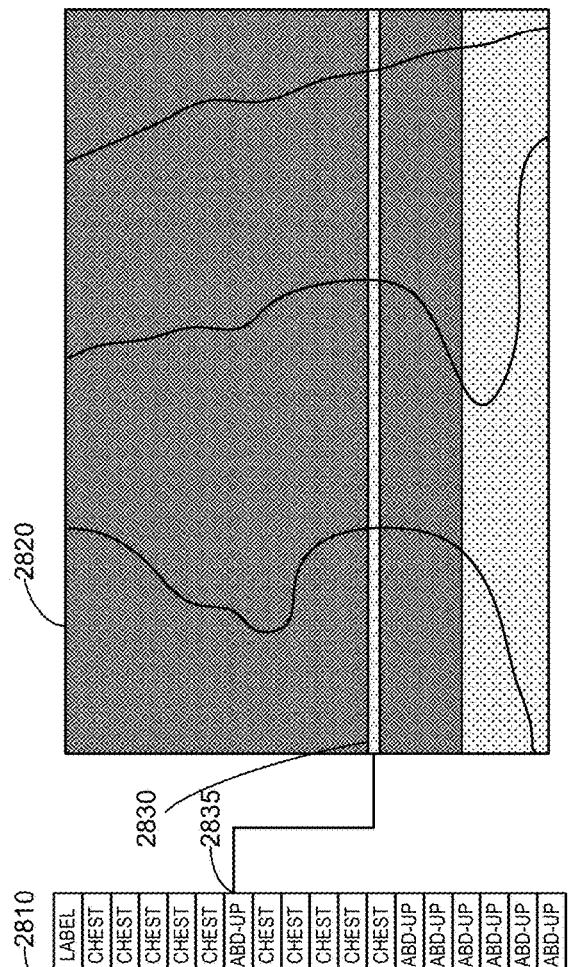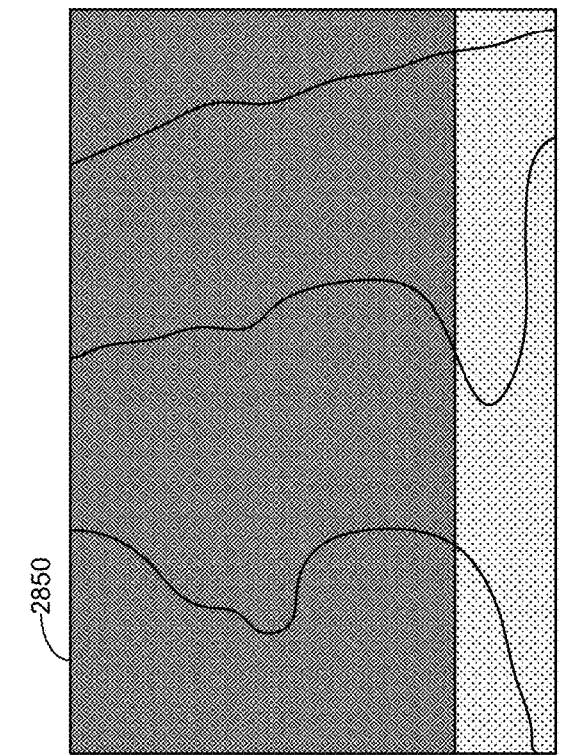
FIG. 28

AUTOMATED ORGAN RISK SEGMENTATION MACHINE LEARNING METHODS AND SYSTEMS

RELATED APPLICATION

This patent arises from U.S. Provisional Patent Application Ser. No. 62/488,442, which was filed on Apr. 21, 2017. U.S. Provisional Patent Application Ser. No. 62/488,442 is hereby incorporated herein by reference in its entirety. Priority to U.S. Provisional Patent Application Ser. No. 62/488,442 is hereby claimed.

FIELD OF THE DISCLOSURE

This disclosure relates generally to improved medical systems and, more particularly, to improved machine learning systems and methods for medical image processing.

BACKGROUND

A variety of economy, technological, and administrative hurdles challenge healthcare facilities, such as hospitals, clinics, doctors' offices, etc., to provide quality care to patients. Economic drivers, less skilled staff, fewer staff, complicated equipment, and emerging accreditation for controlling and standardizing radiation exposure dose usage across a healthcare enterprise create difficulties for effective management and use of imaging and information systems for examination, diagnosis, and treatment of patients.

Healthcare provider consolidations create geographically distributed hospital networks in which physical contact with systems is too costly. At the same time, referring physicians want more direct access to supporting data in reports along with better channels for collaboration. Physicians have more patients, less time, and are inundated with huge amounts of data, and they are eager for assistance.

Healthcare provider tasks including image processing and analysis, etc., are time consuming and resource intensive tasks that are impractical, if not impossible, for humans to accomplish alone.

BRIEF DESCRIPTION

Certain examples provide systems and methods for improved image segmentation, object identification, and parameter analysis.

Certain examples provide an image data processing system including an anatomy detector to detect an anatomy in an image and to remove items not included in the anatomy from the image. The example system includes a bounding box generator to generate a bounding box around a region of interest in the anatomy. The example system includes a voxel-level segmenter to classify image data within the bounding box at the voxel level to identify an object in the region of interest. The example system includes an output imager to output an indication of the object identified in the region of interest segmented in the image.

Certain examples provide a computer-readable storage medium including instructions which, when executed, cause a processor to at least implement a method of image processing. The example method includes detecting an anatomy in an image. The example method includes removing items not included in the anatomy from the image. The example method includes generating a bounding box around a region of interest in the anatomy. The example method includes classifying image data within the bounding box at the voxel level to identify an object in the region of interest. The example method includes outputting an indication of the object identified in the region of interest segmented in the image.

Certain examples provide a computer-implemented method of image processing including detecting, using at least one processor, an anatomy in an image. The example method includes removing, using the at least one processor, items not included in the anatomy from the image. The example method includes generating, using the at least one processor, a bounding box around a region of interest in the anatomy. The example method includes classifying, using the at least one processor, image data within the bounding box at the voxel level to identify an object in the region of interest. The example method includes outputting, using the at least one processor, an indication of the object identified in the region of interest segmented in the image.

BRIEF DESCRIPTION OF THE DRAWINGS

FIG. 21 shows an example bounding box detection output.

FIG. 28 illustrates an example correction of a misclassified slice in an image.

The figures are not scale. Wherever possible, the same reference numbers will be used throughout the drawings and accompanying written description to refer to the same or like parts.

DETAILED DESCRIPTION

Figure 1:
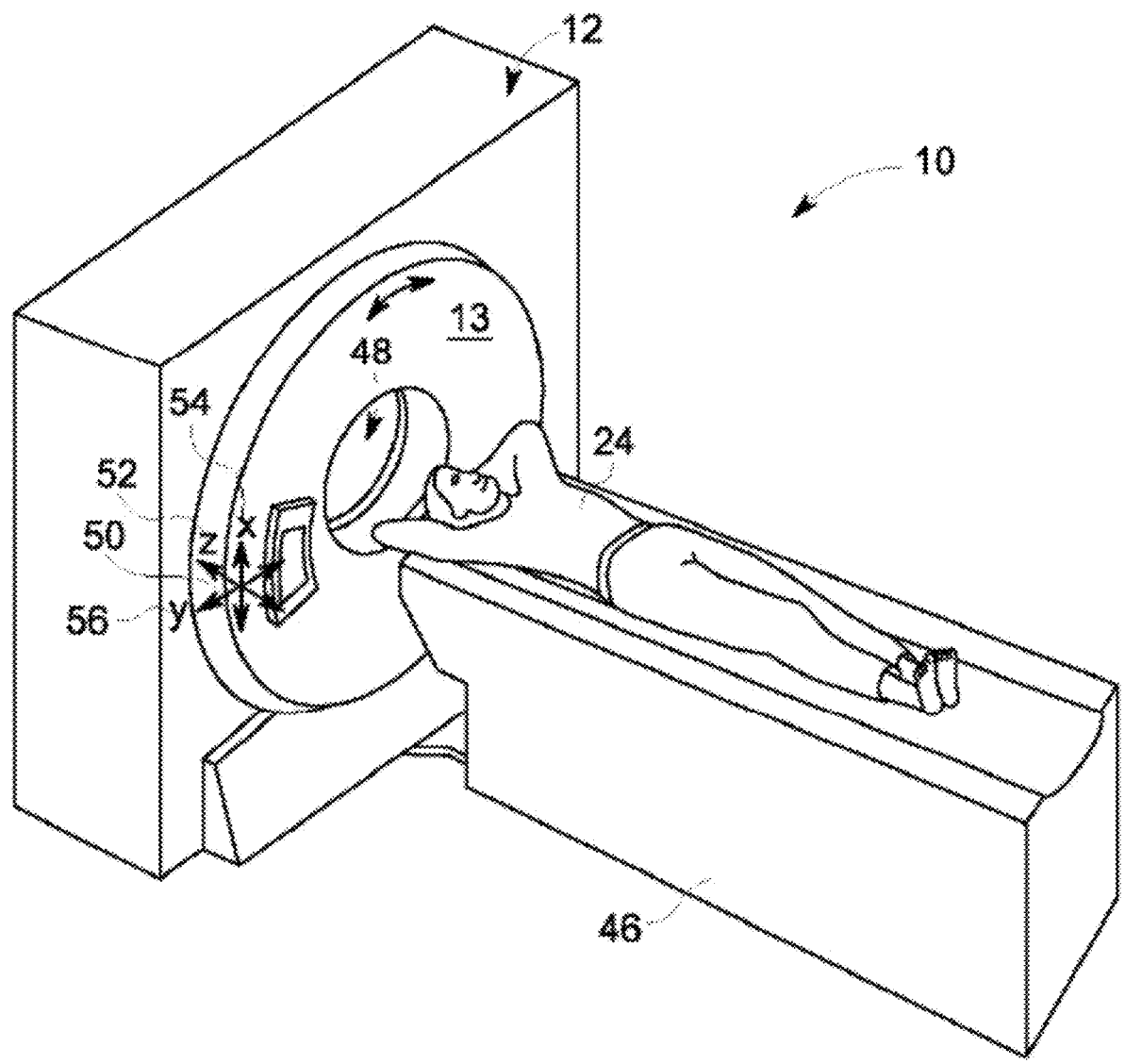
FIGS. 1-2 illustrate an example imaging system to which the methods, apparatus, and articles of manufacture disclosed herein can be applied.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and other changes may be made without departing from the scope of the subject matter of this disclosure. The following detailed description is, therefore, provided to describe an exemplary implementation and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

While certain examples are described below in the context of medical or healthcare systems, other examples can be implemented outside the medical environment. For example, certain examples can be applied to non-medical imaging such as non-destructive testing, explosive detection, etc.

I. Overview

Imaging devices (e.g., gamma camera, positron emission tomography (PET) scanner, computed tomography (CT) scanner, X-Ray machine, magnetic resonance (MR) imaging machine, ultrasound scanner, etc.) generate medical images (e.g., native Digital Imaging and Communications in Medicine (DICOM) images) representative of the parts of the body (e.g., organs, tissues, etc.) to diagnose and/or treat diseases. Medical images may include volumetric data including voxels associated with the part of the body captured in the medical image. Medical image visualization software allows a clinician to segment, annotate, measure, and/or report functional or anatomical characteristics on various locations of a medical image. In some examples, a clinician may utilize the medical image visualization software to identify regions of interest with the medical image.

Acquisition, processing, analysis, and storage of medical image data play an important role in diagnosis and treatment of patients in a healthcare environment. A medical imaging workflow and devices involved in the workflow can be configured, monitored, and updated throughout operation of the medical imaging workflow and devices. Machine learning can be used to help configure, monitor, and update the medical imaging workflow and devices.

For example, segmentation of radiosensitive organs around a target region is a key step of radiotherapy planning. In clinical practice, segmentation is often performed manually, which may take up to several hours. Automating and improving sensitivity, precision, and accuracy of segmentation would greatly improve efficiency, this task would thus greatly improve efficiency and health and safety for patient care.

During automated segmentation, each voxel is to be analyzed to determine whether the voxel belongs to the segmented organ. Such analysis can be time-consuming. Certain examples increase speed, accuracy, and precision of such analysis by detecting and/or otherwise determining the bounding box of various organs.

Certain examples provide and/or facilitate improved imaging devices which improve diagnostic accuracy and/or coverage. Certain examples facilitate improved image reconstruction and further processing to provide improved diagnostic accuracy.

Machine learning techniques, whether deep learning networks or other experiential/observational learning system, can be used to locate an object in an image, understand speech and convert speech into text, and improve the relevance of search engine results, for example. Deep learning is a subset of machine learning that uses a set of algorithms to model high-level abstractions in data using a deep graph with multiple processing layers including linear and non-linear transformations. While many machine learning systems are seeded with initial features and/or network weights to be modified through learning and updating of the machine learning network, a deep learning network trains itself to identify "good" features for analysis. Using a multilayered architecture, machines employing deep learning techniques can process raw data better than machines using conventional machine learning techniques. Examining data for groups of highly correlated values or distinctive themes is facilitated using different layers of evaluation or abstraction.

Throughout the specification and claims, the following terms take the meanings explicitly associated herein, unless the context clearly dictates otherwise. The term "deep learning" is a machine learning technique that utilizes multiple data processing layers to recognize various structures in data sets and classify the data sets with high accuracy. A deep learning network can be a training network (e.g., a training network model or device) that learns patterns based on a plurality of inputs and outputs. A deep learning network can be a deployed network (e.g., a deployed network model or device) that is generated from the training network and provides an output in response to an input.

The term "supervised learning" is a deep learning training method in which the machine is provided already classified data from human sources. The term "unsupervised learning" is a deep learning training method in which the machine is not given already classified data but makes the machine useful for abnormality detection. The term "semi-supervised learning" is a deep learning training method in which the machine is provided a small amount of classified data from human sources compared to a larger amount of unclassified data available to the machine.

The term "representation learning" is a field of methods for transforming raw data into a representation or feature that can be exploited in machine learning tasks. In supervised learning, features are learned via labeled input.

The term "convolutional neural networks" or "CNNs" are biologically inspired networks of interconnected data used in deep learning for detection, segmentation, and recognition of pertinent objects and regions in datasets. CNNs evaluate raw data in the form of multiple arrays, breaking the data in a series of stages, examining the data for learned features.

The term "transfer learning" is a process of a machine storing the information used in properly or improperly solving one problem to solve another problem of the same or similar nature as the first. Transfer learning may also be known as "inductive learning". Transfer learning can make use of data from previous tasks, for example.

The term "active learning" is a process of machine learning in which the machine selects a set of examples for which to receive training data, rather than passively receiving examples chosen by an external entity. For example, as a machine learns, the machine can be allowed to select examples that the machine determines will be most helpful for learning, rather than relying only an external human expert or external system to identify and provide examples.

The term "computer aided detection" or "computer aided diagnosis" refer to computers that analyze medical images for the purpose of suggesting a possible diagnosis.

Certain examples use neural networks and/or other machine learning to implement a new workflow for image analysis including body detection in an image (e.g., a two-dimensional and/or three-dimensional computed tomography (CT), x-ray, etc., image), generation of a bounding box around a region of interest, and voxel analysis in the bounding box region. Certain examples facilitate a cloud-shaped stochastic feature-set of a fully-connected network (FCN) in conjunction with multi-layer input features of a CNN using innovative network architectures with gradient boosting machine (GBM) stacking over the FCN and CNN with associated feature sets to segment an image and identify organ(s) in the image.

Deep Learning and Other Machine Learning

Deep learning is a class of machine learning techniques employing representation learning methods that allows a machine to be given raw data and determine the representations needed for data classification. Deep learning ascertains structure in data sets using backpropagation algorithms which are used to alter internal parameters (e.g., node weights) of the deep learning machine. Deep learning machines can utilize a variety of multilayer architectures and algorithms. While machine learning, for example, involves an identification of features to be used in training the network, deep learning processes raw data to identify features of interest without the external identification.

Deep learning in a neural network environment includes numerous interconnected nodes referred to as neurons. Input neurons, activated from an outside source, activate other neurons based on connections to those other neurons which are governed by the machine parameters. A neural network behaves in a certain manner based on its own parameters. Learning refines the machine parameters, and, by extension, the connections between neurons in the network, such that the neural network behaves in a desired manner.

Deep learning that utilizes a convolutional neural network segments data using convolutional filters to locate and identify learned, observable features in the data. Each filter or layer of the CNN architecture transforms the input data to increase the selectivity and invariance of the data. This abstraction of the data allows the machine to focus on the features in the data it is attempting to classify and ignore irrelevant background information.

Deep learning operates on the understanding that many datasets include high level features which include low level features. While examining an image, for example, rather than looking for an object, it is more efficient to look for edges which form motifs which form parts, which form the object being sought. These hierarchies of features can be found in many different forms of data such as speech and text, etc.

Learned observable features include objects and quantifiable regularities learned by the machine during supervised learning. A machine provided with a large set of well classified data is better equipped to distinguish and extract the features pertinent to successful classification of new data.

A deep learning machine that utilizes transfer learning may properly connect data features to certain classifications affirmed by a human expert. Conversely, the same machine can, when informed of an incorrect classification by a human expert, update the parameters for classification. Settings and/or other configuration information, for example, can be guided by learned use of settings and/or other configuration information, and, as a system is used more (e.g., repeatedly and/or by multiple users), a number of variations and/or other possibilities for settings and/or other configuration information can be reduced for a given situation.

An example deep learning neural network can be trained on a set of expert classified data, for example. This set of data builds the first parameters for the neural network, and this would be the stage of supervised learning. During the stage of supervised learning, the neural network can be tested whether the desired behavior has been achieved.

Once a desired neural network behavior has been achieved (e.g., a machine has been trained to operate according to a specified threshold, etc.), the machine can be deployed for use (e.g., testing the machine with "real" data, etc.). During operation, neural network classifications can be confirmed or denied (e.g., by an expert user, expert system, reference database, etc.) to continue to improve neural network behavior. The example neural network is then in a state of transfer learning, as parameters for classification that determine neural network behavior are updated based on ongoing interactions. In certain examples, the neural network can provide direct feedback to another process. In certain examples, the neural network outputs data that is buffered (e.g., via the cloud, etc.) and validated before it is provided to another process.

Deep learning machines using convolutional neural networks (CNNs) can be used for image analysis. Stages of CNN analysis can be used for facial recognition in natural images, computer-aided diagnosis (CAD), etc.

High quality medical image data can be acquired using one or more imaging modalities, such as x-ray, computed tomography (CT), molecular imaging and computed tomography (MICT), magnetic resonance imaging (MRI), etc. Medical image quality is often not affected by the machines producing the image but the patient. A patient moving during an MRI can create a blurry or distorted image that can prevent accurate diagnosis, for example.

Interpretation of medical images, regardless of quality, is only a recent development. Medical images are largely interpreted by physicians, but these interpretations can be subjective, affected by the condition of the physician's experience in the field and/or fatigue. Image analysis via machine learning can support a healthcare practitioner's workflow.

Deep learning machines can provide computer aided detection support to improve their image analysis with respect to image quality and classification, for example. However, issues facing deep learning machines applied to the medical field often lead to numerous false classifications. Deep learning machines must overcome small training datasets and require repetitive adjustments, for example.

Deep learning machines, with minimal training, can be used to determine the quality of a medical image, for example. Semi-supervised and unsupervised deep learning machines can be used to quantitatively measure qualitative aspects of images. For example, deep learning machines can be utilized after an image has been acquired to determine if the quality of the image is sufficient for diagnosis. Supervised deep learning machines can also be used for computer aided diagnosis. Supervised learning can help reduce susceptibility to false classification, for example.

Deep learning machines can utilize transfer learning when interacting with physicians to counteract the small dataset available in the supervised training. These deep learning machines can improve their computer aided diagnosis over time through training and transfer learning.

II. Description of Examples

Example Imaging Systems

Figure 2:
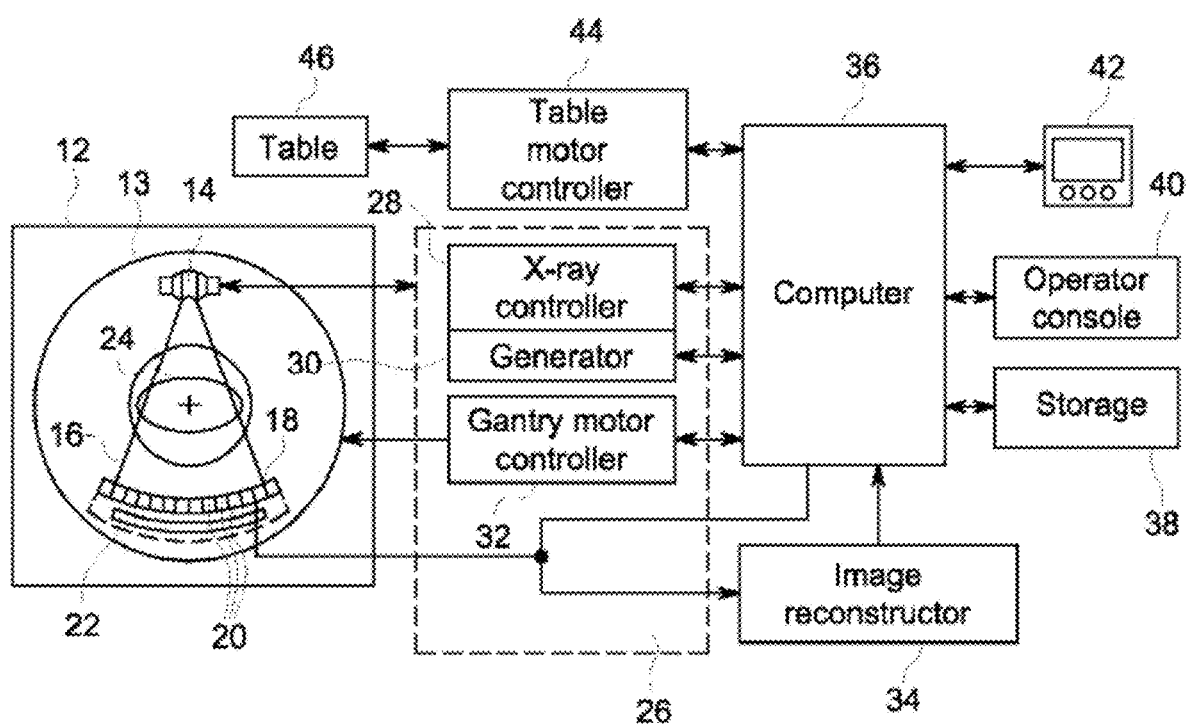

The methods, apparatus, and articles of manufacture described herein can be applied to a variety of healthcare and non-healthcare systems. In one particular example, the methods, apparatus, and articles of manufacture described herein can be applied to the components, configuration, and operation of a computed tomography (CT) imaging system. FIGS. 1-2 illustrate an example implementation of a CT imaging scanner to which the methods, apparatus, and articles of manufacture disclosed herein can be applied. FIGS. 1 and 2 show a CT imaging system 10 including a gantry 12. Gantry 12 has a rotary member 13 with an x-ray source 14 that projects a beam of x-rays 16 toward a detector assembly 18 on the opposite side of the rotary member 13. A main bearing may be utilized to attach the rotary member 13 to the stationary structure of the gantry 12. X-ray source 14 includes either a stationary target or a rotating target. Detector assembly 18 is formed by a plurality of detectors 20 and data acquisition systems (DAS) 22, and can include a collimator. The plurality of detectors 20 sense the projected x-rays that pass through a subject 24, and DAS 22 converts the data to digital signals for subsequent processing. Each detector 20 produces an analog or digital electrical signal that represents the intensity of an impinging x-ray beam and hence the attenuated beam as it passes through subject 24. During a scan to acquire x-ray projection data, rotary member 13 and the components mounted thereon can rotate about a center of rotation.

Rotation of rotary member 13 and the operation of x-ray source 14 are governed by a control mechanism 26 of CT system 10. Control mechanism 26 can include an x-ray controller 28 and generator 30 that provides power and timing signals to x-ray source 14 and a gantry motor controller 32 that controls the rotational speed and position of rotary member 13. An image reconstructor 34 receives sampled and digitized x-ray data from DAS 22 and performs high speed image reconstruction. The reconstructed image is output to a computer 36 which stores the image in a computer storage device 38.

Computer 36 also receives commands and scanning parameters from an operator via operator console 40 that has some form of operator interface, such as a keyboard, mouse, touch sensitive controller, voice activated controller, or any other suitable input apparatus. Display 42 allows the operator to observe the reconstructed image and other data from computer 36. The operator supplied commands and parameters are used by computer 36 to provide control signals and information to DAS 22, x-ray controller 28, and gantry motor controller 32. In addition, computer 36 operates a table motor controller 44 which controls a motorized table 46 to position subject 24 and gantry 12. Particularly, table 46 moves a subject 24 through a gantry opening 48, or bore, in whole or in part. A coordinate system 50 defines a patient or Z-axis 52 along which subject 24 is moved in and out of opening 48, a gantry circumferential or X-axis 54 along which detector assembly 18 passes, and a Y-axis 56 that passes along a direction from a focal spot of x-ray tube 14 to detector assembly 18.

Thus, certain examples can apply machine learning techniques to configuration and/or operation of the CT scanner 10 and its gantry 12, rotary member 13, x-ray source 14, detector assembly 18, control mechanism 26, image reconstructor 34, computer 36, operator console 40, display 42, table controller 44, table 46, and/or gantry opening 48, etc. Component configuration, operation, etc., can be monitored based on input, desired output, actual output, etc., to learn and suggest change(s) to configuration, operation, and/or image capture and/or processing of the scanner 10 and/or its components, for example.

Example Learning Network Systems

Figure 3:
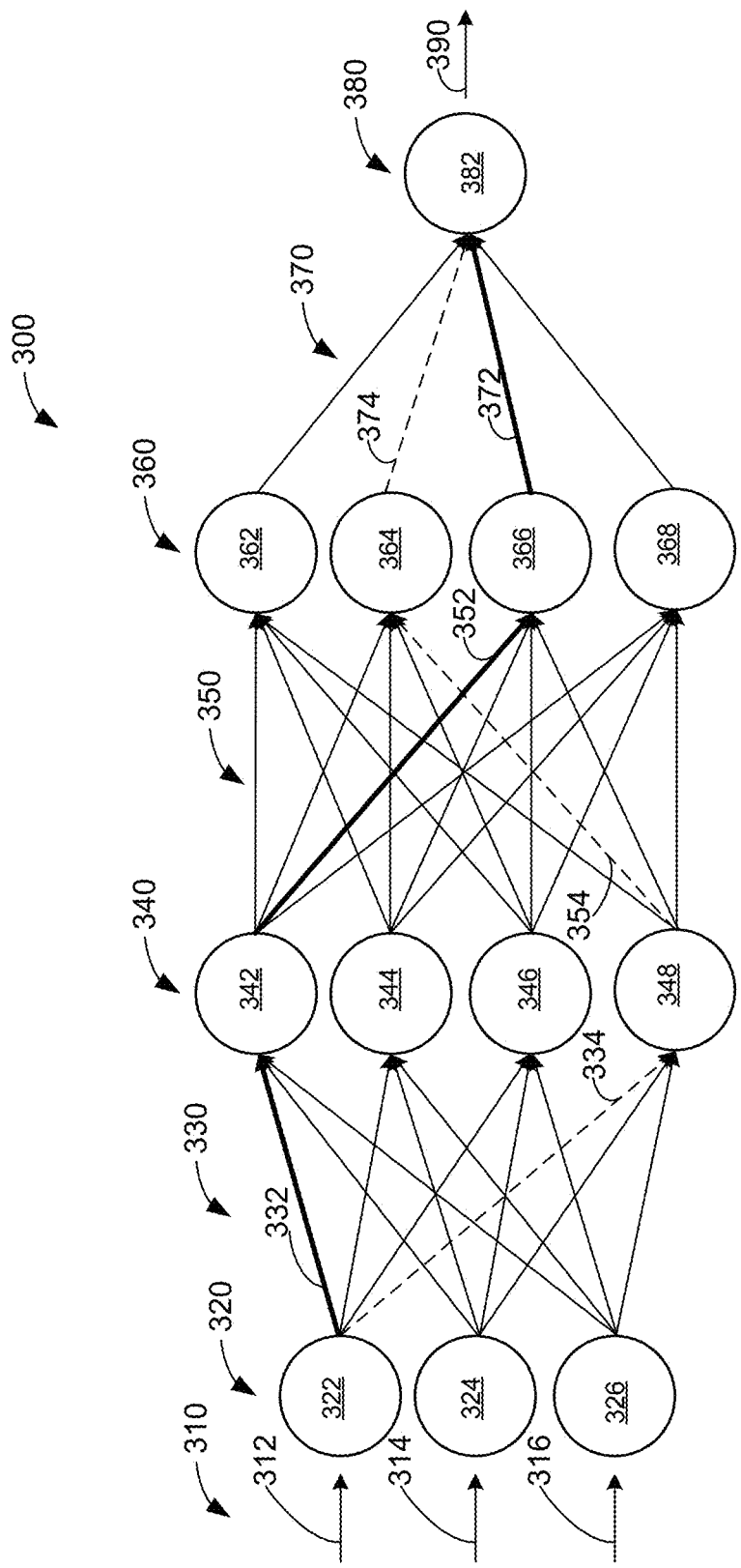
FIG. 3 is a representation of an example learning neural network.

FIG. 3 is a representation of an example learning neural network 300. The example neural network 300 includes layers 320, 340, 360, and 380. The layers 320 and 340 are connected with neural connections 330. The layers 340 and 360 are connected with neural connections 350. The layers 360 and 380 are connected with neural connections 370. Data flows forward via inputs 312, 314, 316 from the input layer 320 to the output layer 380 and to an output 390.

The layer 320 is an input layer that, in the example of FIG. 3, includes a plurality of nodes 322, 324, 326. The layers 340 and 360 are hidden layers and include, the example of FIG. 3, nodes 342, 344, 346, 348, 362, 364, 366, 368. The neural network 300 may include more or less hidden layers 340 and 360 than shown. The layer 380 is an output layer and includes, in the example of FIG. 3, a node 382 with an output 390. Each input 312-316 corresponds to a node 322-326 of the input layer 320, and each node 322-326 of the input layer 320 has a connection 330 to each node 342-348 of the hidden layer 340. Each node 342-348 of the hidden layer 340 has a connection 350 to each node 362-368 of the hidden layer 360. Each node 362-368 of the hidden layer 360 has a connection 370 to the output layer 380. The output layer 380 has an output 390 to provide an output from the example neural network 300.

Of connections 330, 350, and 370 certain example connections 332, 352, 372 may be given added weight while other example connections 334, 354, 374 may be given less weight in the neural network 300. Input nodes 322-326 are activated through receipt of input data via inputs 312-316, for example. Nodes 342-348 and 362-368 of hidden layers 340 and 360 are activated through the forward flow of data through the network 300 via the connections 330 and 350, respectively. Node 382 of the output layer 380 is activated after data processed in hidden layers 340 and 360 is sent via connections 370. When the output node 382 of the output layer 380 is activated, the node 382 outputs an appropriate value based on processing accomplished in hidden layers 340 and 360 of the neural network 300.

Figure 4:
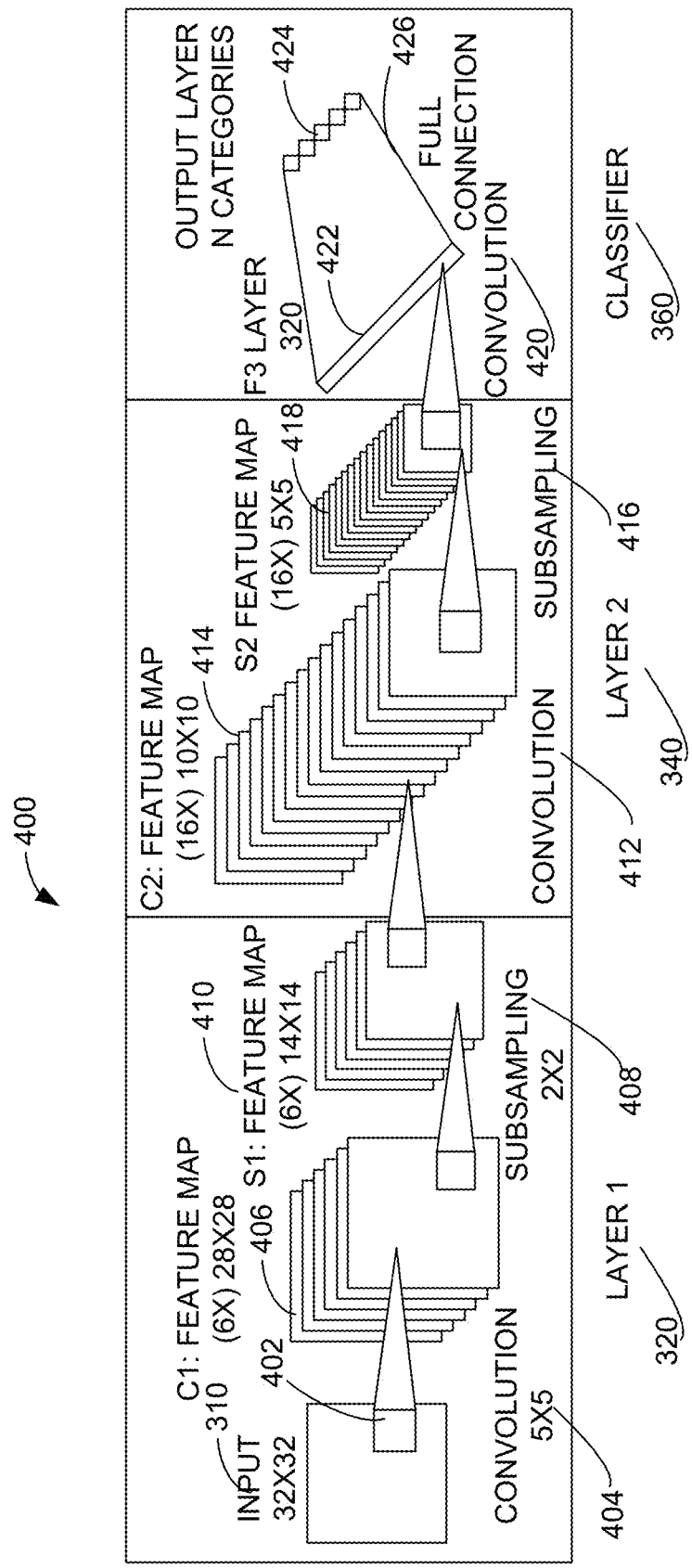
FIG. 4 illustrates a particular implementation of the example neural network as a convolutional neural network.

FIG. 4 illustrates a particular implementation of the example neural network 300 as a convolutional neural network 400. As shown in the example of FIG. 4, an input 310 is provided to the first layer 320 which processes and propagates the input 310 to the second layer 340. The input 310 is further processed in the second layer 340 and propagated to the third layer 360. The third layer 360 categorizes data to be provided to the output layer e80. More specifically, as shown in the example of FIG. 4, a convolution 404 (e.g., a 5×5 convolution, etc.) is applied to a portion or window (also referred to as a "receptive field") 402 of the input 310 (e.g., a 32×32 data input, etc.) in the first layer 320 to provide a feature map 406 (e.g., a (6×) 28×28 feature map, etc.). The convolution 404 maps the elements from the input 310 to the feature map 406. The first layer 320 also provides subsampling (e.g., 2×2 subsampling, etc.) to generate a reduced feature map 410 (e.g., a (6×) 14×14 feature map, etc.). The feature map 410 undergoes a convolution 412 and is propagated from the first layer 320 to the second layer 340, where the feature map 410 becomes an expanded feature map 414 (e.g., a (16×) 10×10 feature map, etc.). After subsampling 416 in the second layer 340, the feature map 414 becomes a reduced feature map 418 (e.g., a (16×) 4×5 feature map, etc.). The feature map 418 undergoes a convolution 420 and is propagated to the third layer 360, where the feature map 418 becomes a classification layer 422 forming an output layer of N categories 424 with connection 426 to the convoluted layer 422, for example.

Figure 5:
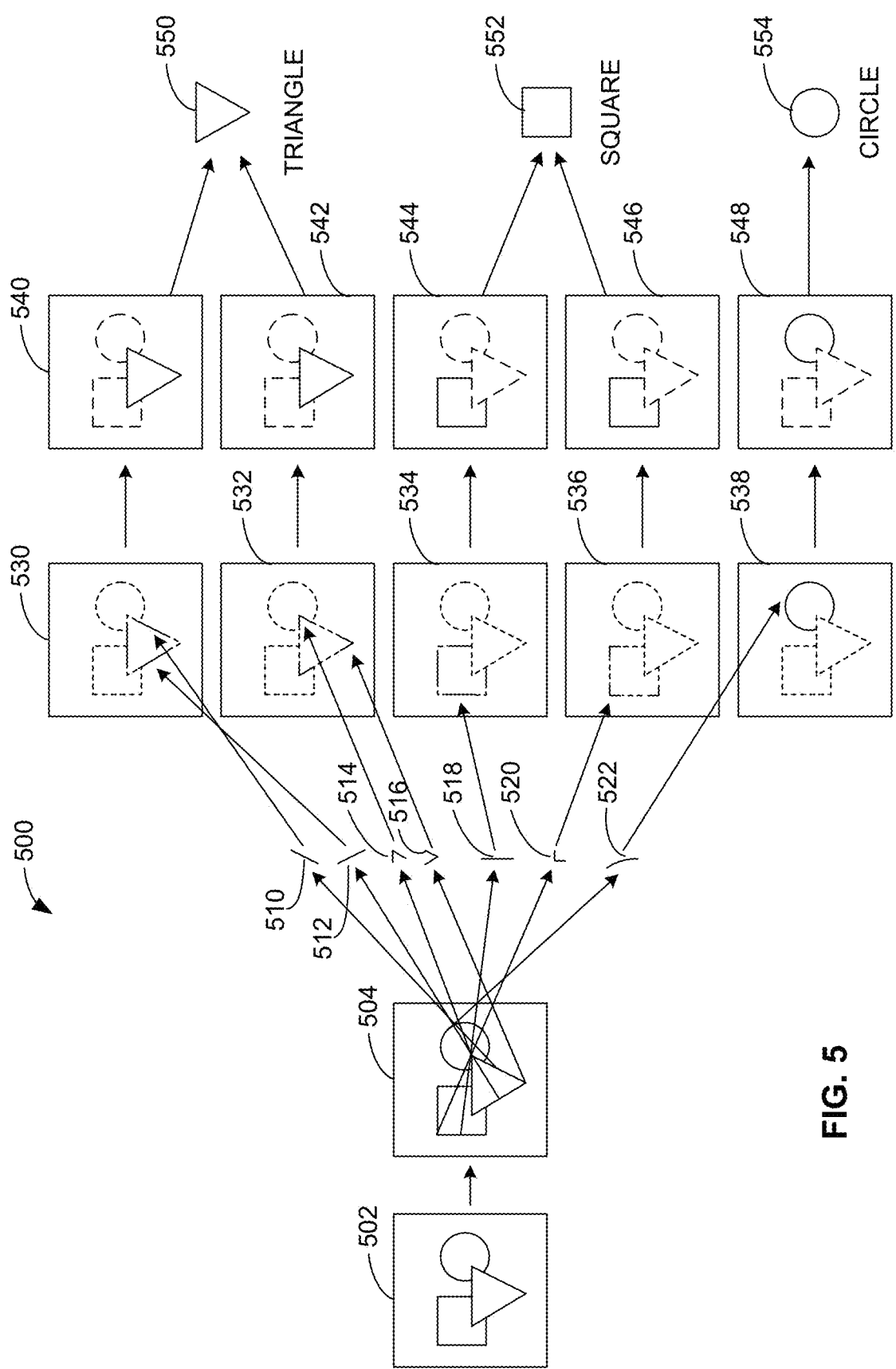
FIG. 5 is a representation of an example implementation of an image analysis convolutional neural network.

FIG. 5 is a representation of an example implementation of an image analysis convolutional neural network 500. The convolutional neural network 500 receives an input image 502 and abstracts the image in a convolution layer 504 to identify learned features 510-522. In a second convolution layer 530, the image is transformed into a plurality of images 530-538 in which the learned features 510-522 are each accentuated in a respective sub-image 530-538. The images 530-538 are further processed to focus on the features of interest 510-522 in images 540-548. The resulting images 540-548 are then processed through a pooling layer which reduces the size of the images 540-548 to isolate portions 550-554 of the images 540-548 including the features of interest 510-522. Outputs 550-554 of the convolutional neural network 500 receive values from the last non-output layer and classify the image based on the data received from the last non-output layer. In certain examples, the convolutional neural network 500 may contain many different variations of convolution layers, pooling layers, learned features, and outputs, etc.

Figure 6A:
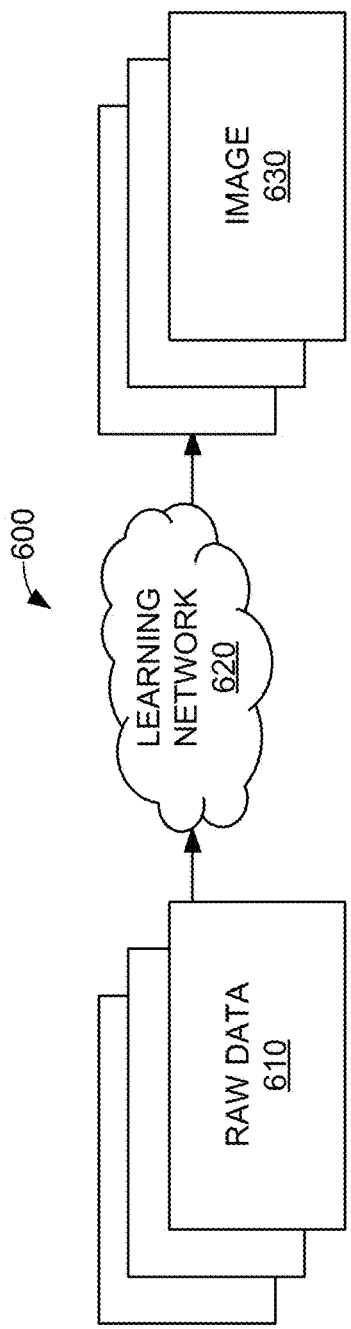
FIG. 6A illustrates an example configuration to apply a learning network to process and/or otherwise evaluate an image.

FIG. 6A illustrates an example configuration 600 to apply a learning (e.g., machine learning, deep learning, etc.) network to process and/or otherwise evaluate an image. Machine learning can be applied to a variety of processes including image acquisition, image reconstruction, image analysis/diagnosis, etc. As shown in the example configuration 600 of FIG. 6A, raw data 610 (e.g., raw data 610 such as sonogram raw data, etc., obtained from an imaging scanner such as an x-ray, computed tomography, ultrasound, magnetic resonance, etc., scanner) is fed into a learning network 620. The learning network 620 processes the data 610 to correlate and/or otherwise combine the raw image data 620 into a resulting image 630 (e.g., a "good quality" image and/or other image providing sufficient quality for diagnosis, etc.). The learning network 620 includes nodes and connections (e.g., pathways) to associate raw data 610 with a finished image 630. The learning network 620 can be a training network that learns the connections and processes feedback to establish connections and identify patterns, for example. The learning network 620 can be a deployed network that is generated from a training network and leverages the connections and patterns established in the training network to take the input raw data 610 and generate the resulting image 630, for example.

Once the learning 620 is trained and produces good images 630 from the raw image data 610, the network 620 can continue the "self-learning" process and refine its performance as it operates. For example, there is "redundancy" in the input data (raw data) 610 and redundancy in the network 620, and the redundancy can be exploited.

If weights assigned to nodes in the learning network 620 are examined, there are likely many connections and nodes with very low weights. The low weights indicate that these connections and nodes contribute little to the overall performance of the learning network 620. Thus, these connections and nodes are redundant. Such redundancy can be evaluated to reduce redundancy in the inputs (raw data) 610. Reducing input 610 redundancy can result in savings in scanner hardware, reduced demands on components, and also reduced exposure dose to the patient, for example.

In deployment, the configuration 600 forms a package 600 including an input definition 610, a trained network 620, and an output definition 630. The package 600 can be deployed and installed with respect to another system, such as an imaging system, analysis engine, etc.

Figure 6B:
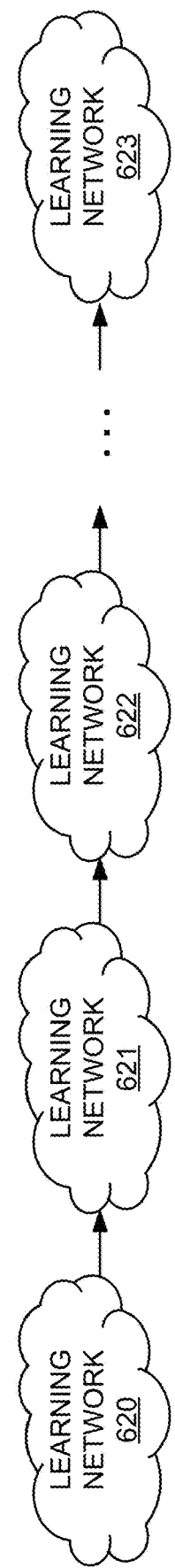
FIG. 6B illustrates a combination of a plurality of learning networks.

As shown in the example of FIG. 6B, the learning network 620 can be chained and/or otherwise combined with a plurality of learning networks 621-623 to form a larger learning network. The combination of networks 620-623 can be used to further refine responses to inputs and/or allocate networks 620-623 to various aspects of a system, for example.

In some examples, in operation, "weak" connections and nodes can initially be set to zero. The learning network 620 then processes its nodes in a retaining process. In certain examples, the nodes and connections that were set to zero are not allowed to change during the retraining. Given the redundancy present in the network 620, it is highly likely that equally good images will be generated. As illustrated in FIG. 6B, after retraining, the learning network 620 becomes DLN 621. The learning network 621 is also examined to identify weak connections and nodes and set them to zero. This further retrained network is learning network 622. The example learning network 622 includes the "zeros" in learning network 621 and the new set of nodes and connections. The learning network 622 continues to repeat the processing until a good image quality is reached at a learning network 623, which is referred to as a "minimum viable net (MVN)". The learning network 623 is a MVN because if additional connections or nodes are attempted to be set to zero in learning network 623, image quality can suffer.

Once the MVN has been obtained with the learning network 623, "zero" regions (e.g., dark irregular regions in a graph) are mapped to the input 610. Each dark zone is likely to map to one or a set of parameters in the input space. For example, one of the zero regions may be linked to the number of views and number of channels in the raw data. Since redundancy in the network 623 corresponding to these parameters can be reduced, there is a highly likelihood that the input data can be reduced and generate equally good output. To reduce input data, new sets of raw data that correspond to the reduced parameters are obtained and run through the learning network 621. The network 620-623 may or may not be simplified, but one or more of the learning networks 620-623 is processed until a "minimum viable input (MVI)" of raw data input 610 is reached. At the MVI, a further reduction in the input raw data 610 may result in reduced image 630 quality. The MVI can result in reduced complexity in data acquisition, less demand on system components, reduced stress on patients (e.g., less breath-hold or contrast), and/or reduced dose to patients, for example.

By forcing some of the connections and nodes in the learning networks 620-623 to zero, the network 620-623 to build "collaterals" to compensate. In the process, insight into the topology of the learning network 620-623 is obtained. Note that network 621 and network 622, for example, have different topology since some nodes and/or connections have been forced to zero. This process of effectively removing connections and nodes from the network extends beyond "deep learning" and can be referred to as "deep-deep learning", for example.

In certain examples, input data processing and deep learning stages can be implemented as separate systems. However, as separate systems, neither module may be aware of a larger input feature evaluation loop to select input parameters of interest/importance. Since input data processing selection matters to produce high-quality outputs, feedback from deep learning systems can be used to perform input parameter selection optimization or improvement via a model. Rather than scanning over an entire set of input parameters to create raw data (e.g., which is brute force and can be expensive), a variation of active learning can be implemented. Using this variation of active learning, a starting parameter space can be determined to produce desired or "best" results in a model. Parameter values can then be randomly decreased to generate raw inputs that decrease the quality of results while still maintaining an acceptable range or threshold of quality and reducing runtime by processing inputs that have little effect on the model's quality.

Figure 7:
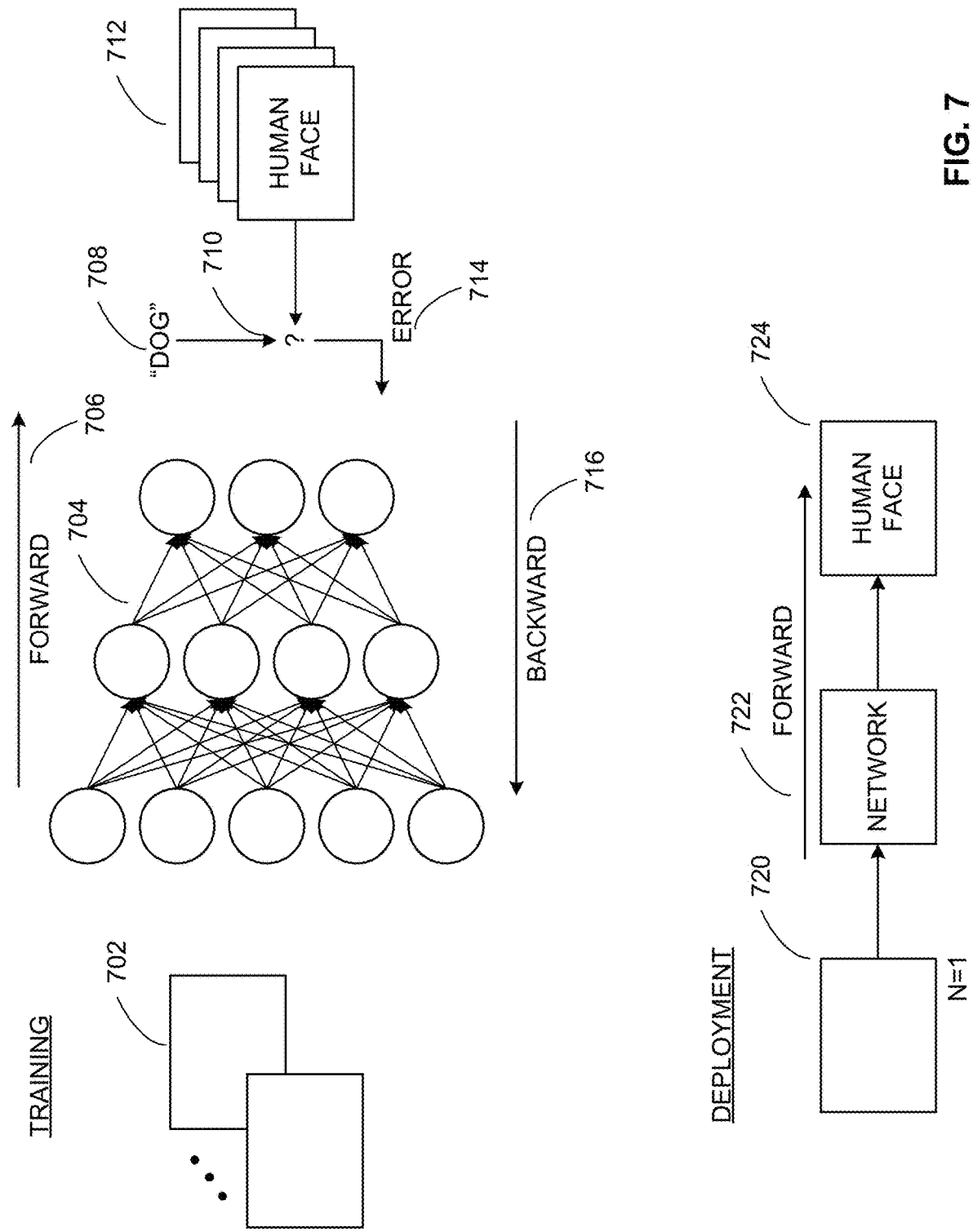
FIG. 7 illustrates example training and deployment phases of a learning network.

FIG. 7 illustrates example training and deployment phases of a learning network, such as a deep learning or other machine learning network. As shown in the example of FIG. 7, in the training phase, a set of inputs 702 is provided to a network 704 for processing. In this example, the set of inputs 702 can include facial features of an image to be identified. The network 704 processes the input 702 in a forward direction 706 to associate data elements and identify patterns. The network 704 determines that the input 702 represents a dog 708. In training, the network result 708 is compared 710 to a known outcome 712. In this example, the known outcome 712 is a human face (e.g., the input data set 702 represents a human face, not a dog face). Since the determination 708 of the network 704 does not match 710 the known outcome 712, an error 714 is generated. The error 714 triggers an analysis of the known outcome 712 and associated data 702 in reverse along a backward pass 716 through the network 704. Thus, the training network 704 learns from forward 706 and backward 716 passes with data 702, 712 through the network 704.

Once the comparison of network output 708 to known output 712 matches 710 according to a certain criterion or threshold (e.g., matches n times, matches greater than x percent, etc.), the training network 704 can be used to generate a network for deployment with an external system. Once deployed, a single input 720 is provided to a deployed learning network 722 to generate an output 724. In this case, based on the training network 704, the deployed network 722 determines that the input 720 is an image of a human face 724.

Figure 8:
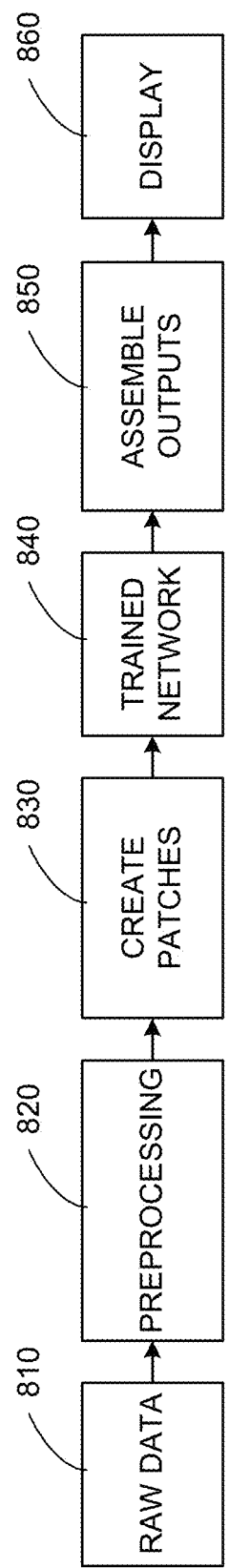
FIG. 8 illustrates an example product leveraging a trained network package to provide a deep learning product offering.

FIG. 8 illustrates an example product leveraging a trained network package to provide a deep and/or other machine learning product offering. As shown in the example of FIG. 8, an input 810 (e.g., raw data) is provided for preprocessing 820. For example, the raw input data 810 is preprocessed 820 to check format, completeness, etc. Once the data 810 has been preprocessed 820, patches are created 830 of the data. For example, patches or portions or "chunks" of data are created 830 with a certain size and format for processing. The patches are then fed into a trained network 840 for processing. Based on learned patterns, nodes, and connections, the trained network 840 determines outputs based on the input patches. The outputs are assembled 850 (e.g., combined and/or otherwise grouped together to generate a usable output, etc.). The output is then displayed 860 and/or otherwise output to a user (e.g., a human user, a clinical system, an imaging modality, a data storage (e.g., cloud storage, local storage, edge device, etc.), etc.).

Figure 9A:
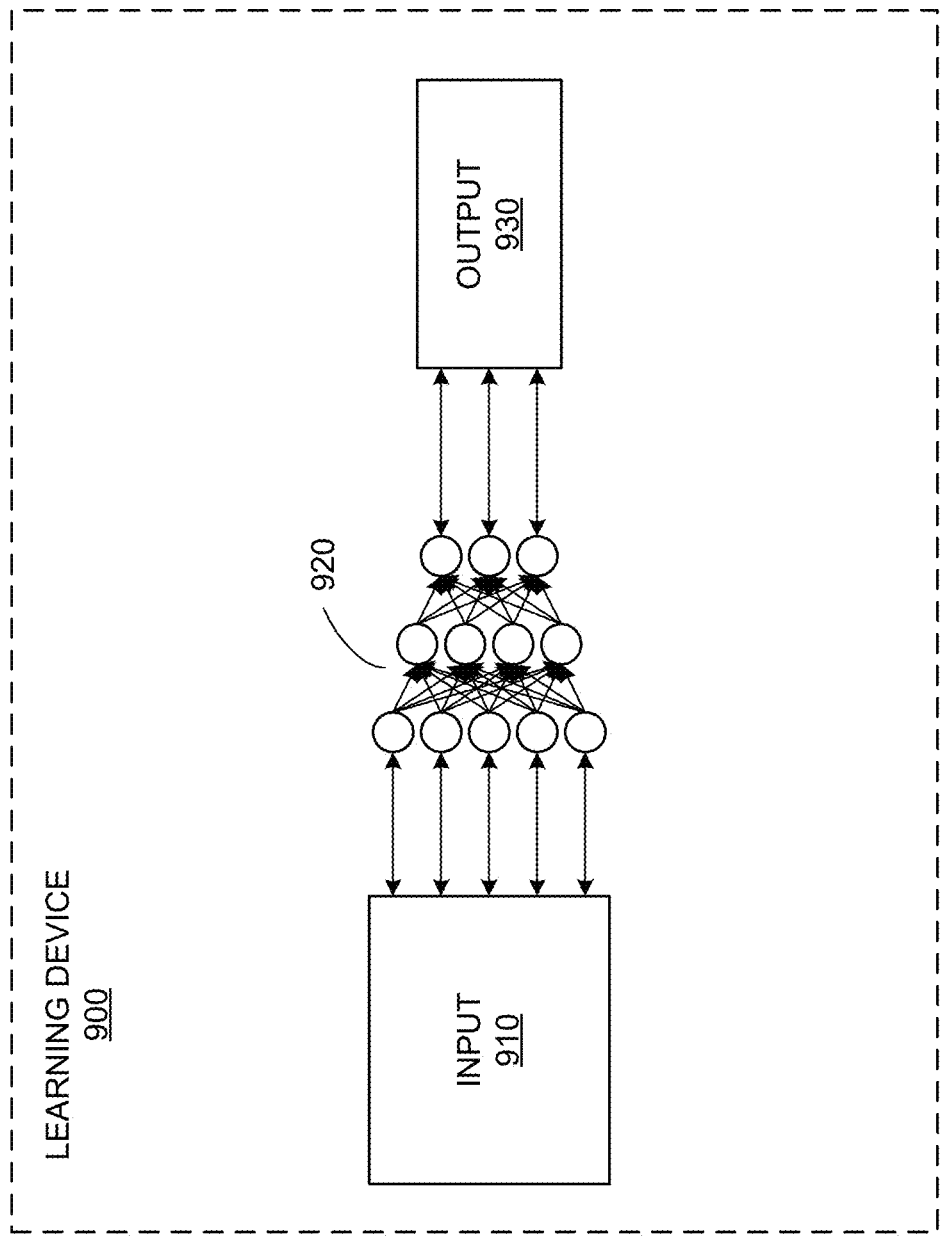
FIGS. 9A-9C illustrate various deep learning device configurations.
Figure 9B:
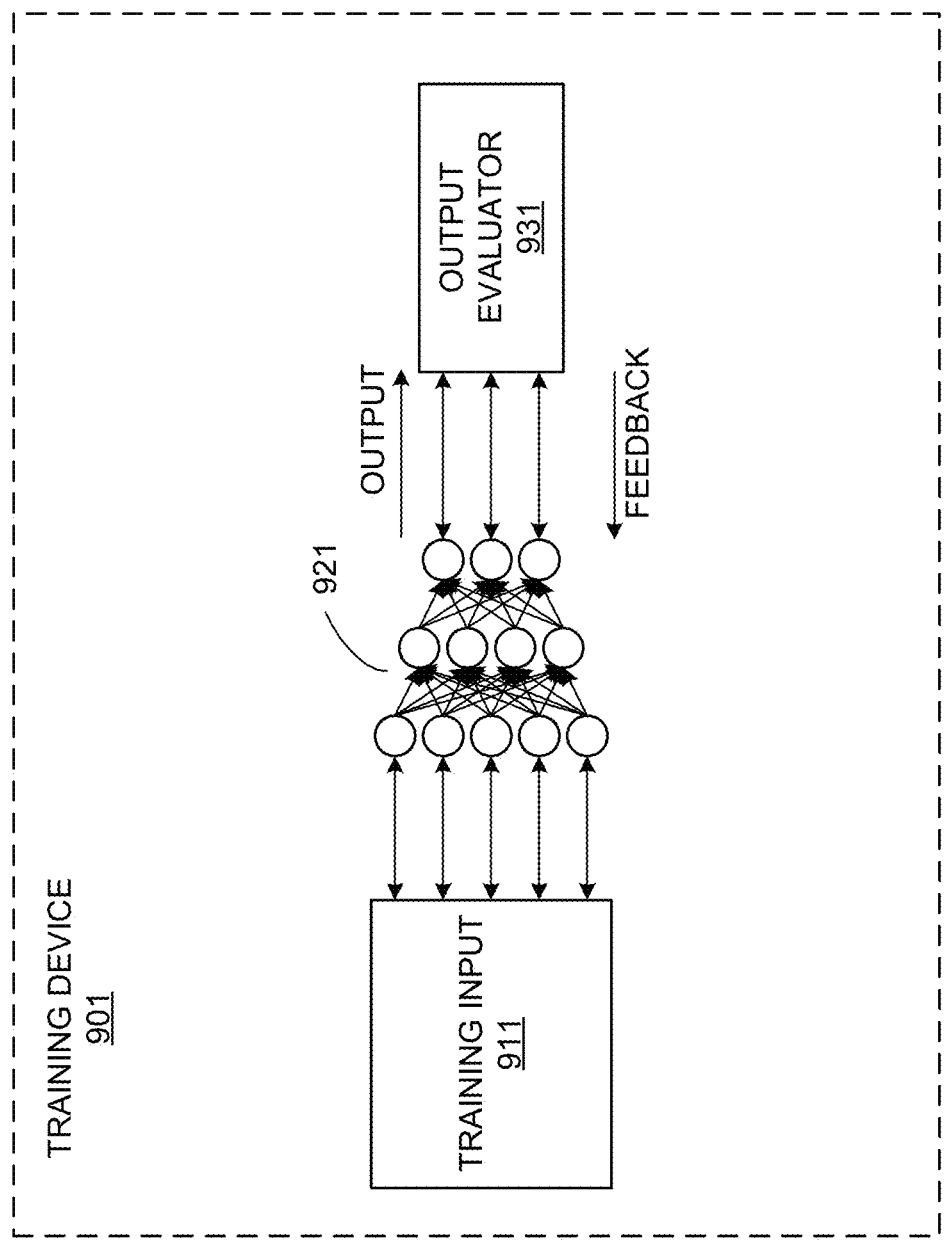
Figure 9C:
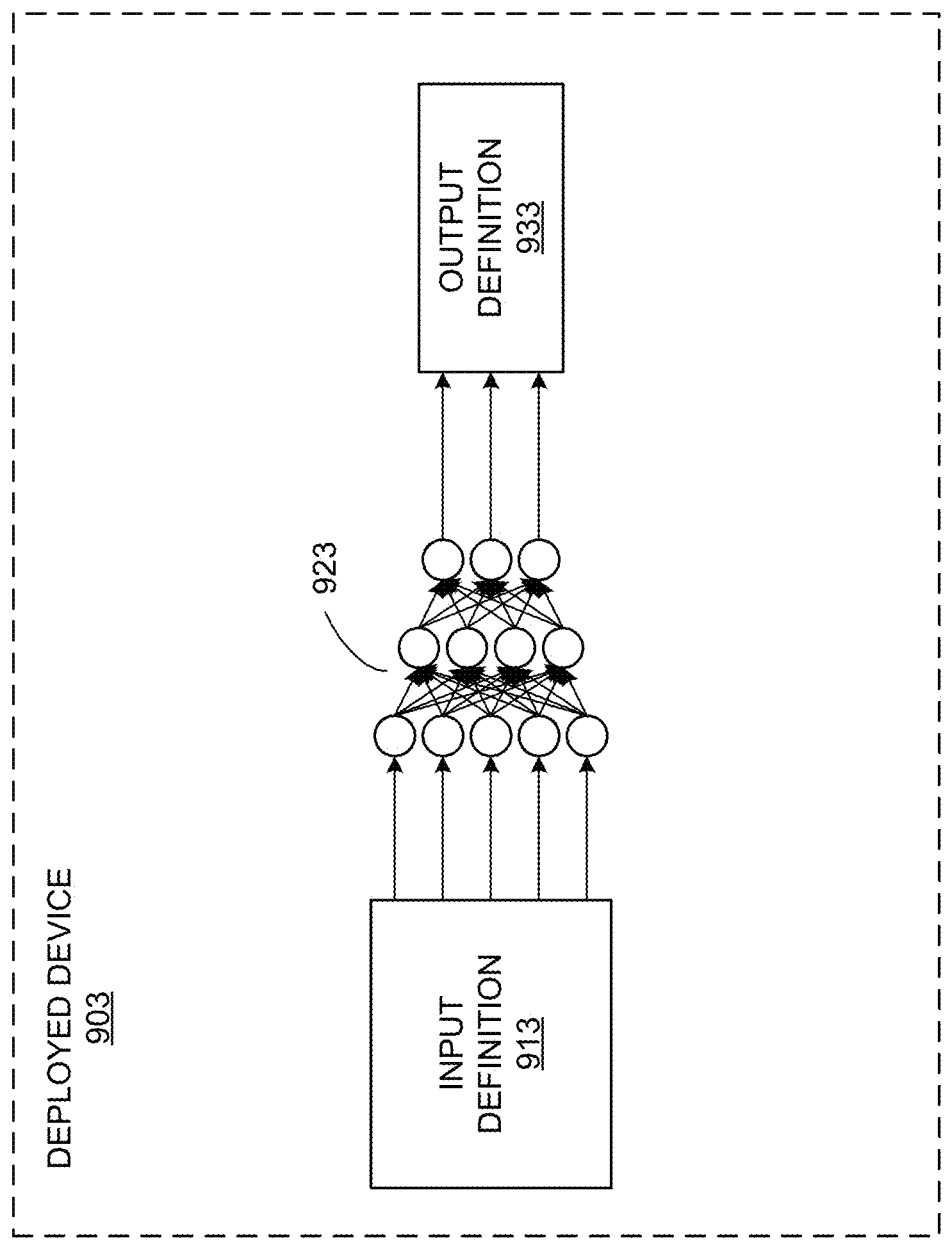

As discussed above, learning networks can be packaged as devices for training, deployment, and application to a variety of systems. FIGS. 9A-9C illustrate various learning device configurations. For example, FIG. 9A shows a general learning device 900. The example device 900 includes an input definition 910, a learning network model 920, and an output definitions 930. The input definition 910 can include one or more inputs translating into one or more outputs 930 via the network 920.

FIG. 9B shows an example training device 901. That is, the training device 901 is an example of the device 900 configured as a training learning network device. In the example of FIG. 9B, a plurality of training inputs 911 are provided to a network 921 to develop connections in the network 921 and provide an output to be evaluated by an output evaluator 931. Feedback is then provided by the output evaluator 931 into the network 921 to further develop (e.g., train) the network 921. Additional input 911 can be provided to the network 921 until the output evaluator 931 determines that the network 921 is trained (e.g., the output has satisfied a known correlation of input to output according to a certain threshold, margin of error, etc.).

FIG. 9C depicts an example deployed device 903. Once the training device 901 has learned to a requisite level, the training device 901 can be deployed for use. While the training device 901 processes multiple inputs to learn, the deployed device 903 processes a single input to determine an output, for example. As shown in the example of FIG. 9C, the deployed device 903 includes an input definition 913, a trained network 923, and an output definition 933. The trained network 923 can be generated from the network 921 once the network 921 has been sufficiently trained, for example. The deployed device 903 receives a system input 913 and processes the input 913 via the network 923 to generate an output 933, which can then be used by a system with which the deployed device 903 has been associated, for example.

Example Image Segmentation Systems and Methods

Figure 10:
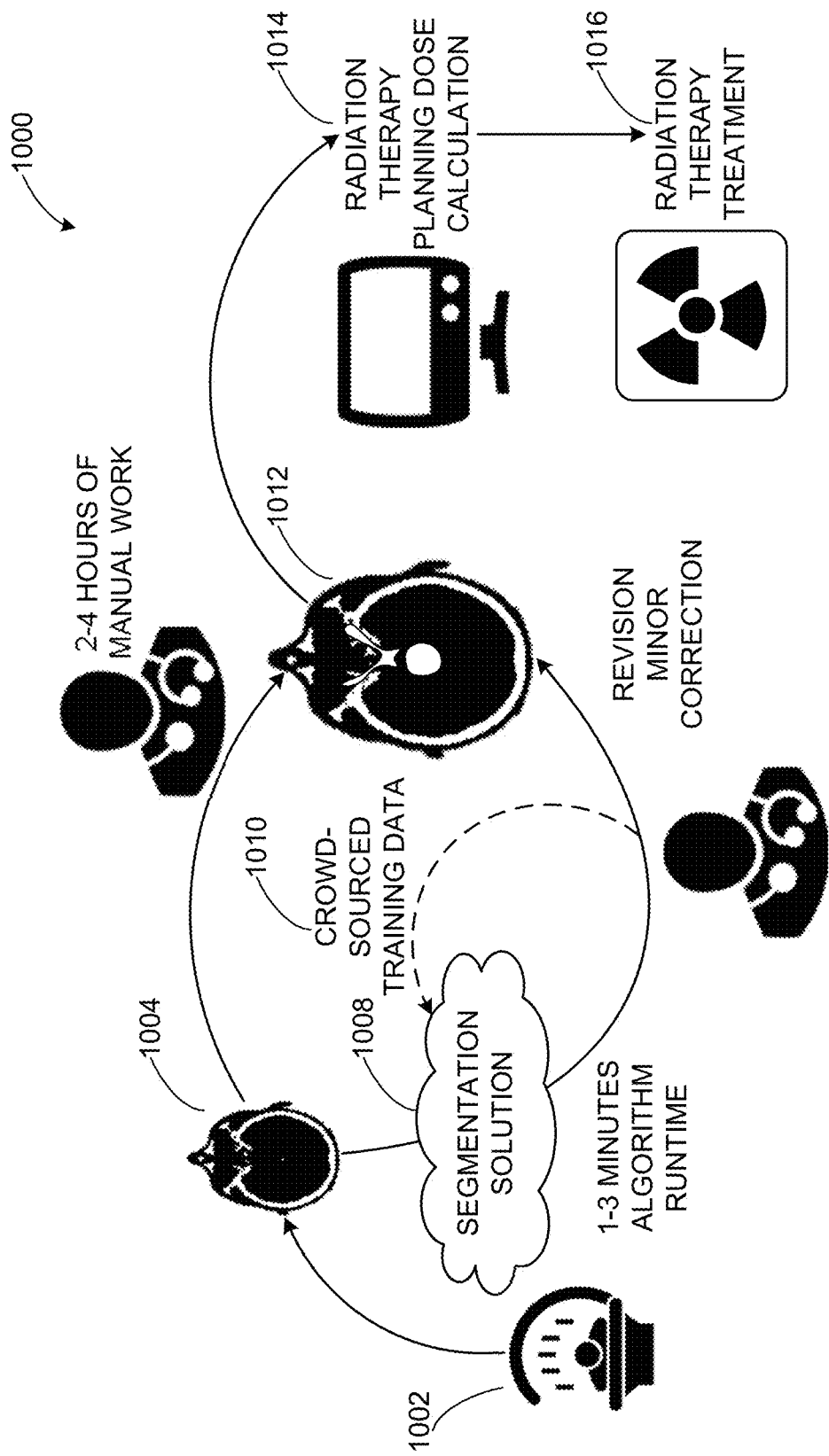
FIG. 10 illustrates an example computer-driven treatment determination process.

As shown in FIG. 10, a segmentation solution can be applied to patient image data to segment the image(s) and identify organ(s) in the image(s). Rather than requiring hours of manual work to review, the segmentation solution acts in a few minutes of runtime and can be improved using training data (e.g., crowd-sourced training data from minor revisions, etc.). The identified organ in the segmented image can be used in planning dose calculation and/or other setting(s) for radiation therapy, etc., to facilitate improved, accurate radiation therapy treatment.

For example, FIG. 10 illustrates an example computer-driven treatment determination process 1000 including an image acquisition 1002 generating an image 1004. While a manual review 1006 of the image 1004 occupies hours (e.g., 2-4 hours, etc.) of radiologist time, a segmentation solution 1008 can process the image 1004 very quickly (e.g., 1-3 minutes, etc.). The segmentation solution 1008 can be a deployed learning network model such as a deployed deep learning model, machine learning model, etc. The segmentation solution 1008 can be updated using training data 1010 such as crowd-sourced training data gathered from observations, input, etc. Alone or with minor revision correction, a segmented image 1012 can then be used for treatment planning such as a radiation therapy planning dose calculation 1014, etc. For example, a size, location, and/or content/composition of a region of interest identified and isolated in the segmented image 1012 can be used to determine radiation type, dosage, frequency, placement, etc., to form part of radiation treatment including the dose calculation 1014. A treatment plan 1016, such as a radiation therapy treatment plan, etc., can be generated based on the segmented image 1012 and dose calculation 1014, for example.

Certain examples provide a hierarchical approach to automated segmentation to assist in radiation dose calculation based on a tumor and nearby radiosensitive organs (e.g., to reduce or minimize dose to radiosensitive organs, etc.). Using the hierarchical approach, a patient's body and/or body part is detected in an image, and a bounding box is formed around an organ or organs of interest. The image data within the bounding box is classified at a voxel level using multiple trained models stacked and/or otherwise combined together. In certain examples, the models and their associated architectures can vary.

Figure 11:
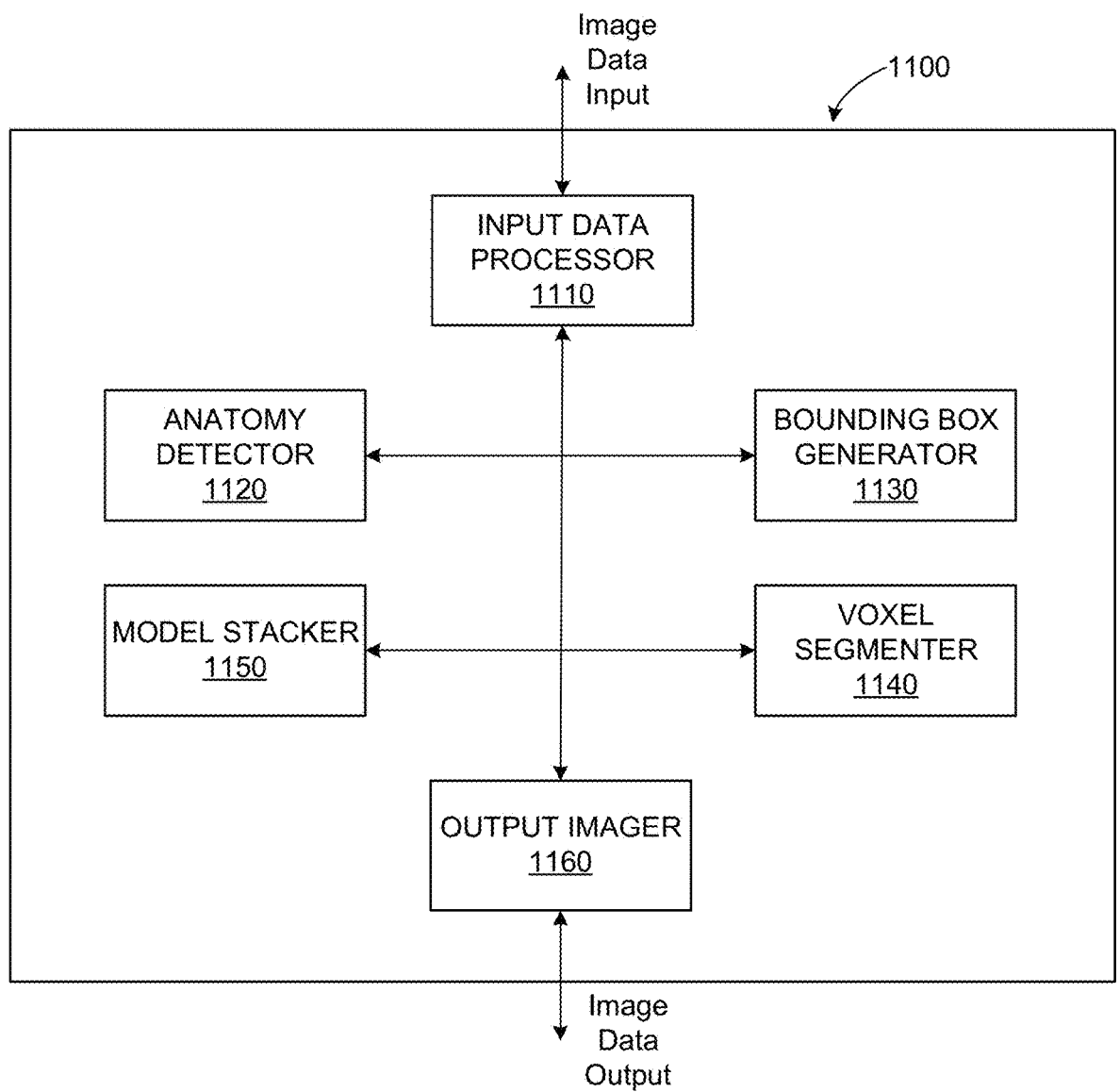
FIG. 11 shows an example image processing system.

FIG. 11 illustrates an example infrastructure system to implement machine learning methods for automated organ-based image segmentation. The system 1100 of FIG. 11 can implement the example process 1000 of FIG. 10, for example. As illustrated in the example of FIG. 11, machine learning can be used to develop fully automated algorithms to delineate various organs such as in the head and neck region on CT images. Organ and/or other object identification enables the calculation of dose-volume histograms during radiotherapy planning without several hours of manual contouring, for example.

FIG. 11 shows an example automated risk-based organ segmentation processing system 1100 to identify organ(s) and/or other anatomy in image data and drive treatment option configuration, planning, etc. The example system 1100 includes an input data processor 1110, an anatomy detector 1120, a bounding box generator 1130, a voxel segmenter 1140, a model stacker 1150, and an output imager 1160. The input data processor 1110 receives image data such as directly from an imaging system (e.g., a CT scanner, ultrasound system, magnetic resonance imaging system, molecular imaging and computed tomography (MICT) system, etc.), indirectly by retrieval/transmission from storage (e.g., in an enterprise archive (EA), vendor neutral archive (VNA), electronic medical record (EMR), picture archiving and communication system (PACS), etc.), etc. For example, CT images of the head and neck region can be retrieved directly from the CT scanner and/or indirectly from an image archive for processing. The input data processor 1110 can process and/or pre-process the image data to prepare the image data for analysis, such as brightness/contrast adjustment, image restoration, geometric transformation, window/level processing, etc.

The input data processor 1110 provides image data to the anatomy detector 1120. The anatomy detector 1120 is to remove irrelevant portions of an image and/or objects in the image to optimize or otherwise improve further processing of the image. In certain examples, the anatomy detector 1120 first segments axial slices into two-dimensional (2D)-connected (non-air) regions. Then, the 2D regions are classified into body and other classes using a support vector machine (SVM). Three-dimensional (3D) post-processing is then applied to preserve the 3D continuity of the body or portion of the anatomy being imaged. For example, the anatomy detector 1120 can process CT image data for a whole body and generate an accurate (e.g., Dice score of 97%, etc.) body contour within a few seconds.

Figure 12:
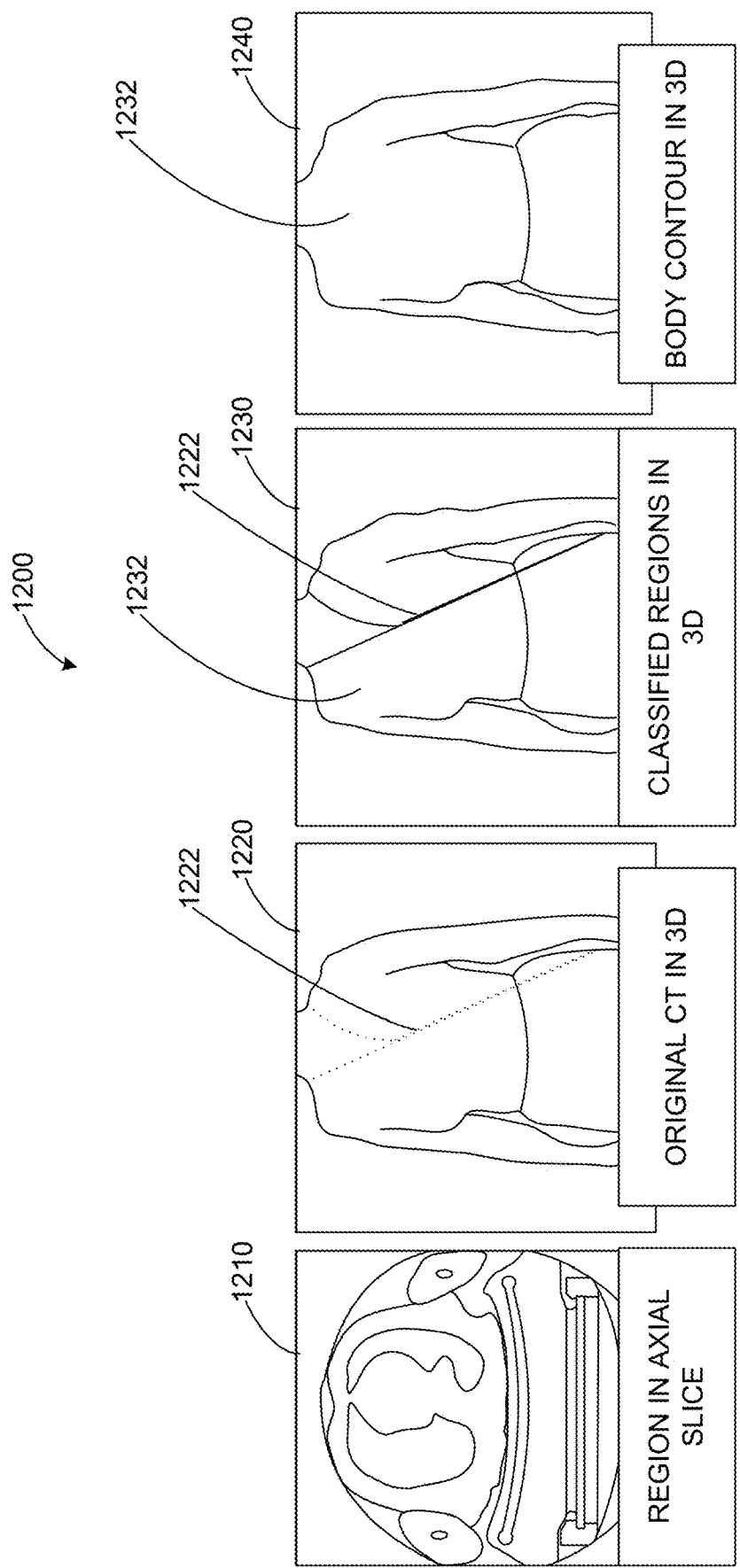
FIG. 12 illustrates an example sequence for body detection in image data by the example anatomy detector of FIG. 11.

FIG. 12 illustrates an example sequence 1200 for body detection in image data by the example anatomy detector 1120 of FIG. 11. For example, a particular region may be of interest in an axial CT slice 1210. However, the original CT image 1220 may include additional items (e.g., intravenous lines, oxygen tubes, implants, etc.) 1222 not part of the body, anatomy, or region of interest. Body detection is used to remove irrelevant part(s) of the image to optimize and/or otherwise improve further processing. As reflected in the example image 1230, starting with the largest structure(s), the image 1230 can be segmented to identify increasingly smaller details inside the image 1230. The body 1232 is the largest object to detect and segment in the image after a patient positioning table and/or other objects 1222 outside the patient body are ignored/removed from the image 1230. Using body detection (also referred to as tray table removal), the body 1232 can be segmented (e.g., in three dimensions (3D) using a volume-based approach, two dimensions (2D) using pixels, etc.) to separate the body 1232 from other connected and/or adjacent objects 1222. As shown in the image 1240, after segmentation and processing (e.g., using a deep learning and/or other machine learning based segmentation solution 1108), only the body 1232 remains in the image 1240. The non-body object 1222 has been removed from the image data.

In certain examples, rather than a volume-based or pixel-based approach, super-pixel segmentation is used to separate the image data into larger pixels and smaller regions. For each slice, the image slice is segmented into foreground and background. For example, axial slices are segmented into 2D-connected (non-air) regions. Then, the 2D regions representing foreground objects are classified into body and other objects (e.g., applying machine learning such as a support vector machine (SVM), etc., using a classifier to classify the foreground objects, etc.). Then, 3D post-processing is applied to preserve the 3D continuity of the body in the image data.

In certain examples, an accurate (e.g., Dice score 97%) body-contour can be determined within a few seconds (using a programmed processor) for a whole-body CT image. For example, a Dice score (also referred to as a Dice value or Dice similarity index) describes how much the detected region overlaps with the "gold standard" or reference image region. In particular, the Dice score is equal to the size of the overlap between the two regions divided by the averaged size of the two regions:

$$\text{Dice} = F1 \text{ score} = \frac{2*|\text{Detected} \cap \text{Real}|}{|\text{Detected}| + |\text{Real}|} = \frac{2*|TP|}{2*|TP| + |FP| + |FN|}, \quad \text{(Eq. 1)}$$

wherein Detected and Real region values are compared with respect to True Positive (TP), False Positive (FP), and False Negative (FN), and wherein the closer the Dice score is to 1 or 100%, the better the alignment, agreement, or overlap between the detected and reference image regions (e.g., with 1 representing perfect segmentation). In other examples, a Jaccard overlap ratio can be used instead of or in addition to the Dice score.

The bounding box generator 1130 receives the processed image data from the anatomy detector 1130 and further processes that image data to detect boundaries of an organ of interest in the image and generate a bounding box around the organ or region of interest. For example, the bounding box generator 1130 determines organ/region boundaries in axial, coronal, and sagittal directions. Certain examples detect the boundaries and form a bounding box based on slice-level classification using a trained deep convolutional network (e.g., trained using a Caffe deep learning framework, etc.). For example, a convolutional neural network model, such as shown in the example of FIG. 3, can be trained using the MICCAI2015 Head and Neck Auto Segmentation challenge dataset (e.g., 33 training patients, etc.), other known/gold standard/truthed/reference image database, etc. A balanced training database can be created by duplication and image augmentation (e.g., rotation, translation, resizing, etc., of the image). The deep learning network (e.g., a Cifar10 net, etc.) can be formed using a plurality of image slices (e.g., three slices, etc.) as input with respect to a target image slice (e.g., at 0, −5 mm, and +5 m, etc., versus the target slice, etc.). The bounding box generator 1130 generates one or more bounding boxes around item(s) of interest in the image (e.g., an organ and/or other region of interest, etc.) based on slice classifier output from the network. Rather than manual image reading and boundary line drawing on an image, deep learning processing by the bounding box generator 1130 determines placement for the bounding box around the organ, region, and/or other item of interest in the image.

Figure 13:
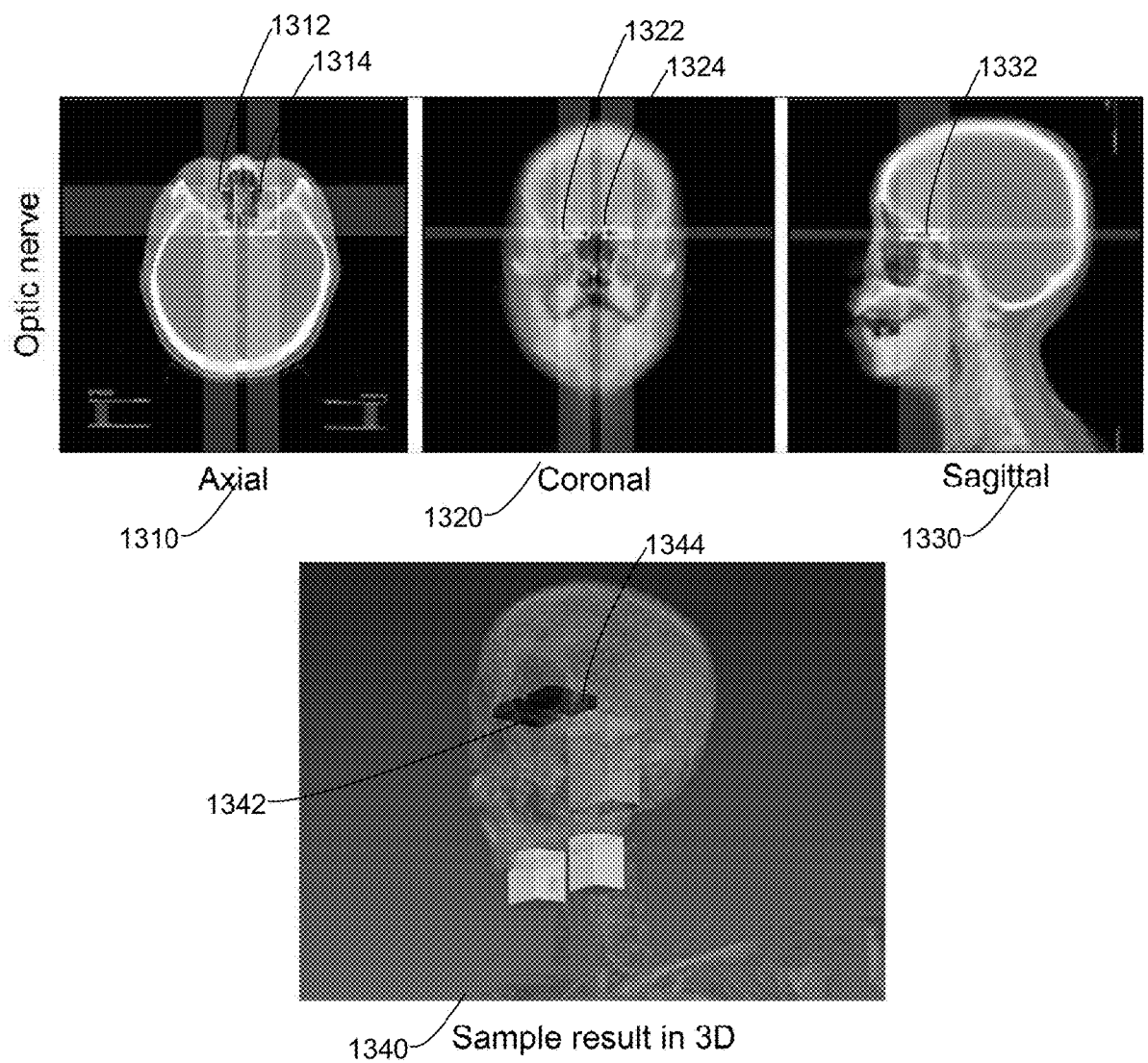
FIG. 13 depicts an example optic nerve identified in a bounding box formed from a plurality of images.

In certain examples, the bounding box can be generated by taking 2D slices of a 3D volume and training a binary classifier to determine a particular organ, such as using a convolutional network with slices in three directions (axial, coronal, sagittal) and classifying. For example, as shown in FIG. 13, an optic nerve can be identified from axial 1310, coronal 1320, and sagittal 1330 images. The optic nerve is bounded in the images 1310-1330 by forming a bounding box from the three images 1330. A training database can be used in preprocessing (e.g., to resize image to get a standard size, center image, etc.). In certain examples, an axial slice can be classified to identify the optic nerve and then certain other direction images can be classified based on an identified location of the optic nerve.

For example, as shown in FIG. 13, the axial image 1310 depicts bounding boxes 1312, 1314 formed around each optic nerve based on an intersection of slice processing information in the image 1310. The same intersection can be identified in the coronal image 1320 to determine bounding boxes 1322, 1314 around the optic nerves in the coronal image 1320. The same intersection can be identified in the sagittal image 1330 to determine bounding box 1332 around the optic nerves in the sagittal image 1330. A composite or 3D image can be generated with information from the slices 1310-1330 and associated bounding boxes 1312-1332 to form composite 3D bounding boxes 1342, 1344 around the two optics nerves in the head and neck area image, for example.

A training database can be created using positive and negative data and used to augment some slices (e.g., rotate, translate, etc.), duplicate some slices, etc., to learn generic and particular image features, etc. In certain examples, parallel slices above and below a target slice can be evaluated to form a bounding box around the organ. For example, the resulting bounding box can be 100-1000 times smaller than the original volume, which speeds up subsequent processing.

In certain examples, one or more metrics can be applied to evaluate post-processing results of the bounding box determination. Example volume-based metrics include Dice score, sensitivity, precision, etc., to evaluate a volume of a correctly classified region versus a volume of an incorrectly classified region. Metrics can be expressed based on a number of true positive (TP), true negative (TN), false positive (FP) and false negative (FN) pixels.

The Dice coefficient or F1 score can be calculated as in Equation 1 above. Sensitivity describes how much of the real bounding box is inside the detected/determined bounding box. In certain examples, sensitivity can be quantified as follows:

$$\text{Sensitivity} = \frac{|\text{Detected} \cap \text{Real}|}{|\text{Real}|} = \frac{|TP|}{|TP| + |FN|}. \quad \text{(Eq. 2)}$$

Precision describes how much of the detected bounding box is corrected detected/determined. In certain examples, precision can be quantified as follows:

$$\text{Precision} = \frac{|\text{Detected} \cap \text{Real}|}{|\text{Detected}|} = \frac{|TP|}{|TP| + |FP|}. \quad \text{(Eq. 3)}$$

In certain examples, another set of metrics describes a distance of detected boundaries from true boundaries. For example, a mean absolute distance provides an average distance between detected faces of the bounding boxes from the corresponding gold standard face (e.g., expressed in millimeters (mm), etc.). The mean absolute distance is calculated separately for a plurality (e.g., three, etc.) of view directions (e.g., axial, coronal, and sagittal, etc.) but averaged over the "beginning" and "end" of an organ in a given direction. A worst case absolute distance provides a worst case distance between the detected faces of the bounding boxes from the corresponding gold standard face (e.g., expressed in mm, etc.). The worst case absolute distance is calculated separately for a plurality (e.g., three, etc.) of view directions (e.g., axial, coronal, and sagittal, etc.). The worst case can be calculated for one patient and/or for a group of patients, for example. A worst case missing distance describes the worst case distance with which the detected region has to be increased to ensure that the full true bounding box falls inside the detected bounding box. Detection failures describe a number of cases in which the system fails to detect the region at all.

Once the bounding box has been determined, image data in the bounding box is segmented at the voxel level. The bounding box generator 1130 provides the image data with bounding box information to the voxel segmenter 1140. The voxel segmenter 1140 classifies each voxel in the bounding box 1342, 1344 to determine whether that voxel belongs to the organ/item of interest. For example, the voxel segmenter 1140 can employ a plurality of methods to select features and model (e.g., two methods of feature selection and two different model architectures, etc.).

Figure 14:
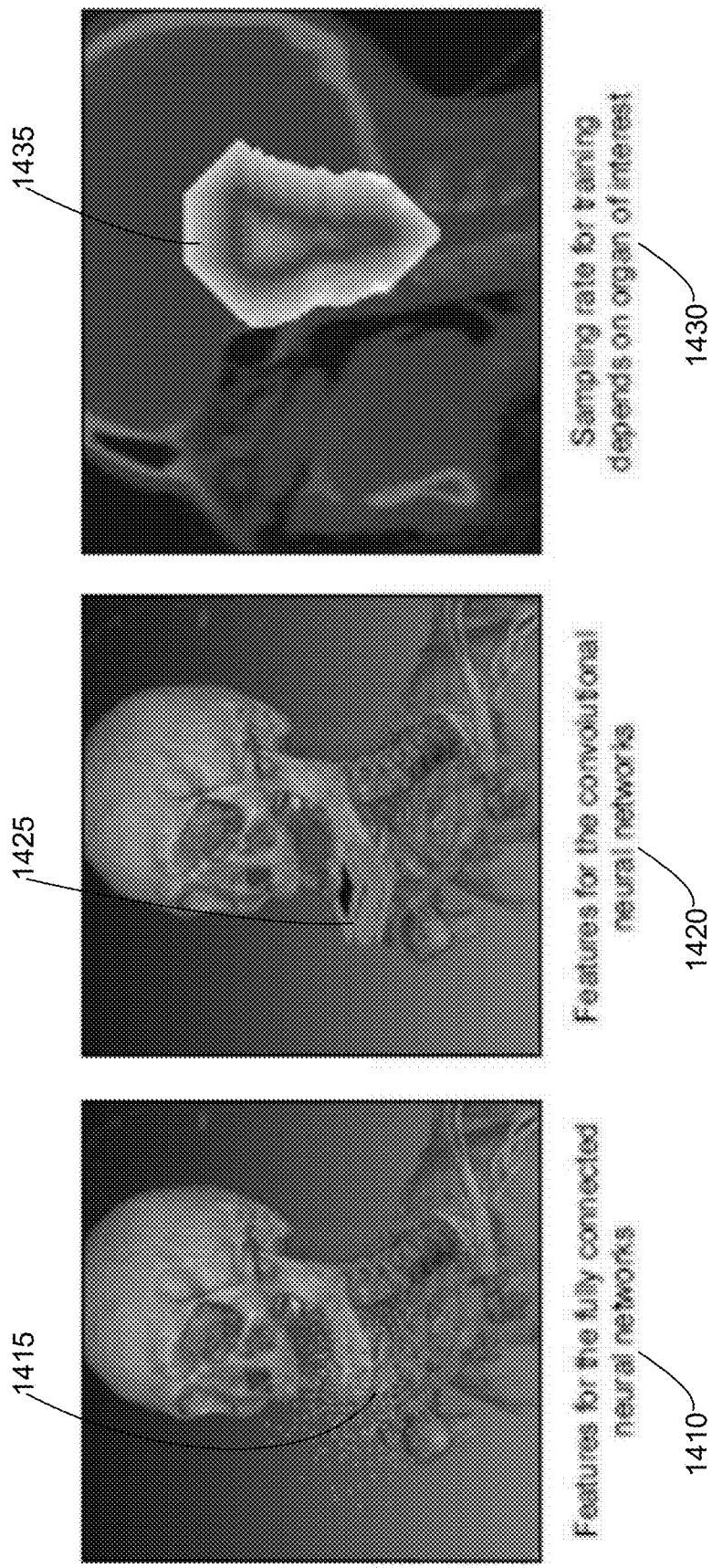
FIG. 14 shows a plurality of example voxel classifications in a given bounding box.

Thus, as shown in the example of FIG. 14, each voxel in a given bounding box is classified to determine whether the voxel belongs to the organ or not. One or more methods (e.g., two different methods, etc.) can be used selected features using one or more model architectures. An example image 1410 shows features in a bounding box 1415 using a fully connected neural network. An example image 1420 shows features in a bounding box 1425 for a convolutional neural network. An example image 1430 shows an example organ of interest highlighted in the image 1430. In certain examples, a sampling rate for network training depends on the particular organ/anatomy of interest.

Figure 15:
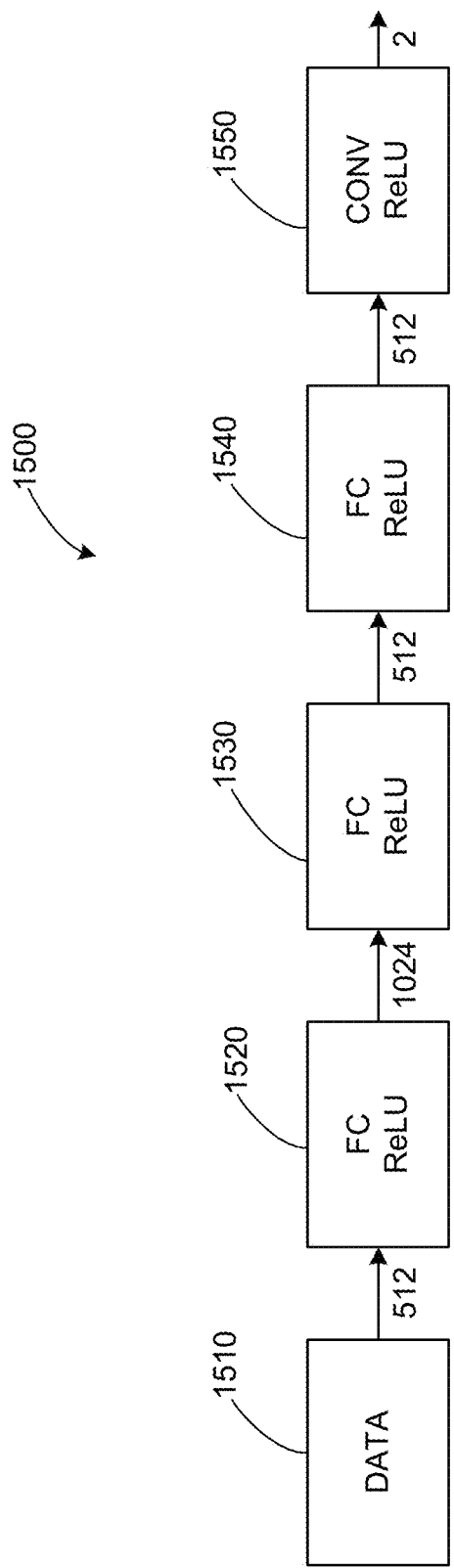
FIG. 15 illustrates an example fully connected network for image data classification.

In certain examples, the voxel segmenter 1140 analyzes neighboring voxels and patches to perform voxel-level segmentation. As shown in the example of FIG. 15, a first method uses a cloud of voxels from a local neighborhood of a target located at predefined random positions, and a fully connected network is trained on the cloud of voxels (e.g., using the H2O framework and/or other machine learning and/or deep learning framework). FIG. 15 illustrates an example fully connected network 1500 in which input data 1510 is provided to a first fully-connected (FC) rectified linear unit (ReLU) 1520 which executes a rectifier activation function with respect to the input data 1510 to generate an output. Thus, in the example of FIG. 15, an input of 512 processed by the FC ReLU 1520 applying a rectifier function to generate an output of 1024 (e.g., using a function such as max(0,x) where x is the input to the node 1520, etc.). The output is provided to a second FC ReLU 1530, which applies a rectifier function to the input to produce an output (e.g., a function applied to 1024 outputs 512, etc.). The FC ReLU 1530 provides that output as input to a third FC ReLU 1540, which applies a rectifier function to the input to produce an output (e.g., a function applied to 512 outputs 512, etc.). The output of the FC ReLU 1540 becomes an input to the convolutional (CONV) ReLU 1550, which applies a convolutional rectifier function to the data to generate an output (e.g., a function applied to 512 outputs 2, etc.).

Figure 16:
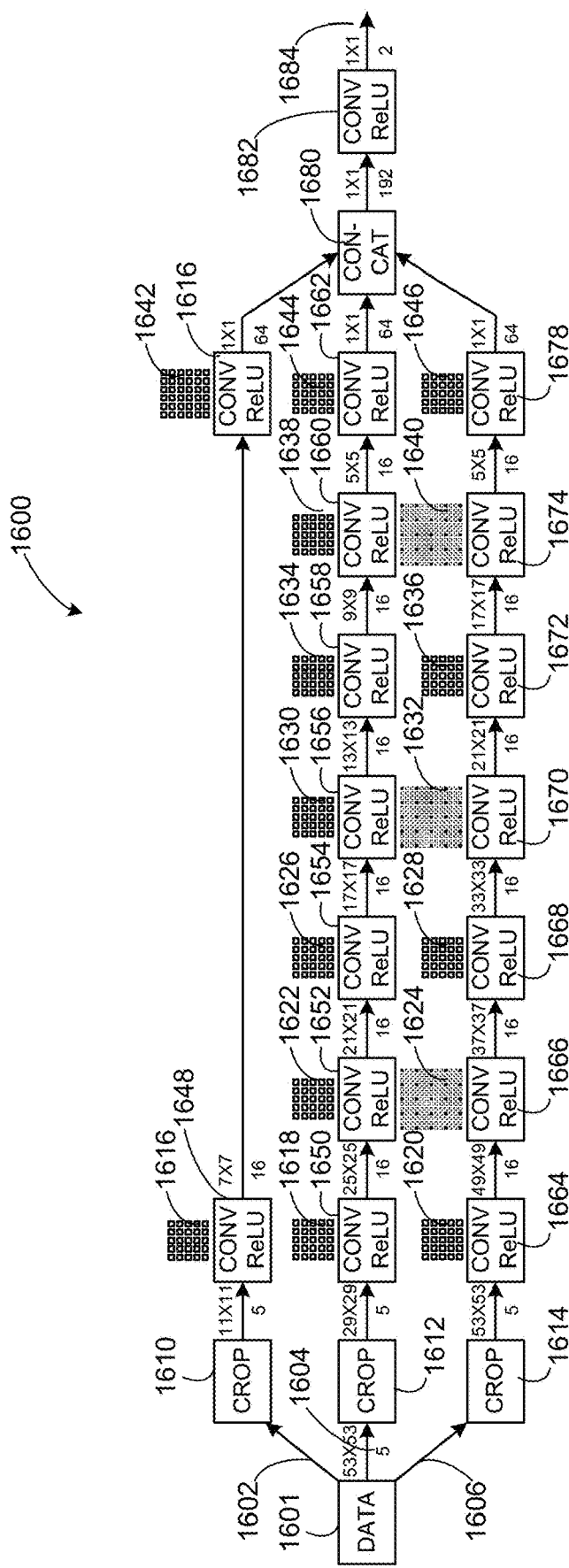
FIG. 16 illustrates an example convolutional neural network evaluating patches around a voxel of interest.
Figure 17:
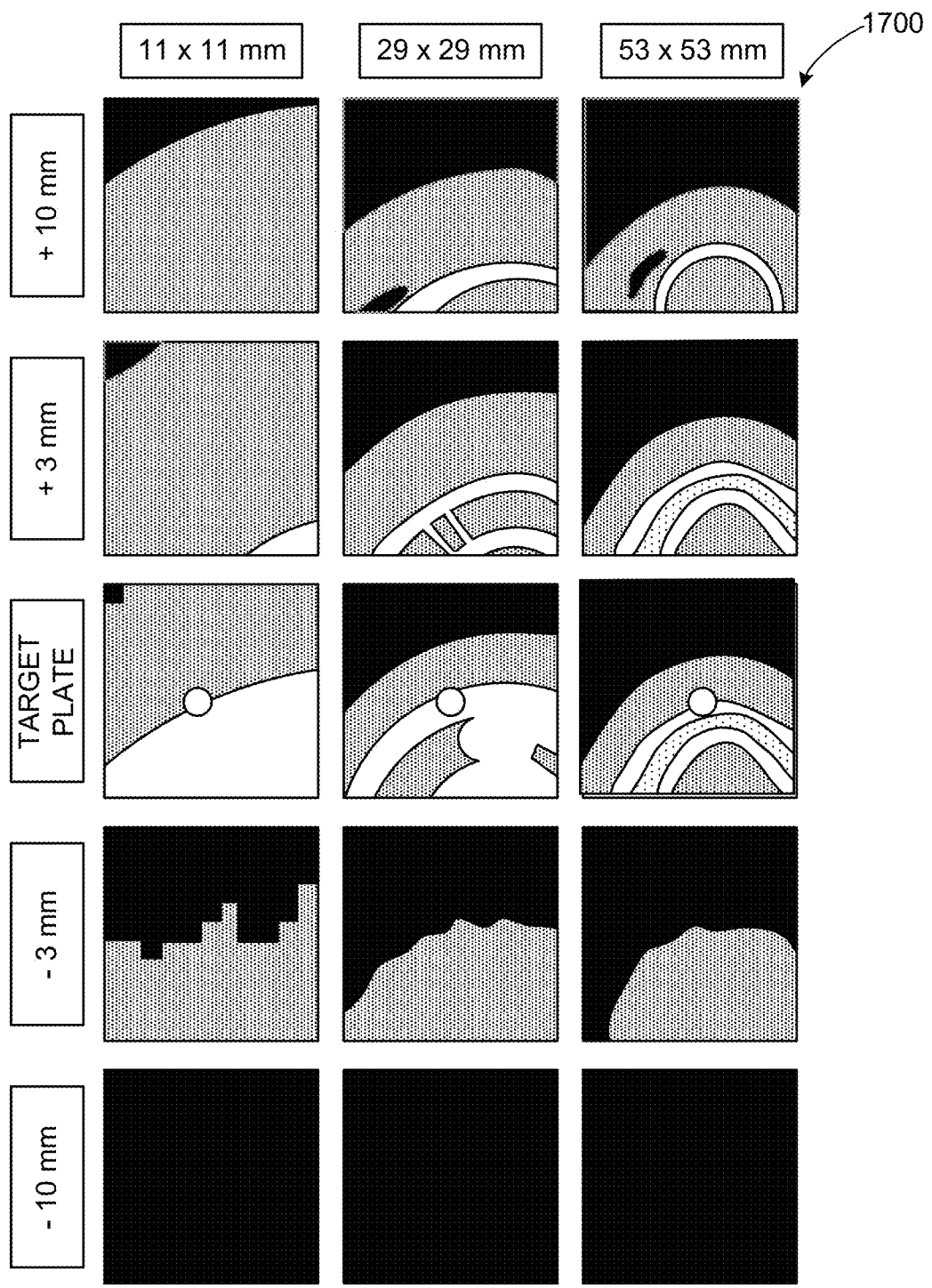
FIG. 17 shows example patches from an image that can be selected and processed using learning network models.

In certain examples, the voxel segmenter 1140 uses image patches around a voxel of interest to train a convolutional network. As shown in the example of FIG. 16, a second method uses patches around the voxel of interest to train a convolutional network (e.g., with Caffe, etc.). FIG. 17 shows example patches 1700 from an image that can be selected and processed using learning network models. The example network architecture 1600 shown in FIG. 16 has a plurality (e.g., three, etc.) branches 1602, 1604, 1604 to process patches of different size, and it has a plurality (e.g., five, etc.) of channels to incorporate 3D information from patches above and below a target slice. Thus, image data 1601 can be cropped 1610-1614 and compared to various patches 1616-1646 via convolutional ReLUs 1648-1678, then concatenated 1680, and processed by another convolutional ReLU 1682 to generate an output 1684. Training is performed on patches, and models can be evaluated on full slices, for example. Creating balanced training databases can be achieved by sampling depending on the distance from the boundary of the organ of interest, for example. In certain examples, post-processing combines thresholding and detection of connected components.

Thus, using voxel segmentation, systems and methods examine each voxel to see where it belongs. Machine learning models and associated algorithms can be used to look at voxel and its brightness or intensity value, as well as examine neighboring voxels. A cloud-shaped model can be used to look at voxel and neighboring voxels (e.g., predefined but random neighboring voxels. In certain examples, a few hundred voxels can provide a good idea of content around an organ or region of interest in an image, and such voxels can be used as a feature to train a neural network.

For example, a middle voxel is classified to determine whether the voxel is in organ or not. Alternatively, patches can be obtained around an organ image, and a convolutional neural network can be used with a limited number of parameters to characterize the region (e.g., using continuous regions such as 1 cm, 3 cm, and 5 cm around the target voxel and three diff patch sizes combined at the end, etc.). A CNN and FCN can be provided and configured (e.g., using a Caffe open source tool, etc.). Patch size, location, etc., can be configured and used to generate two classifications from two models (e.g., CNN, FCN, etc.). Each model's classification represents a prediction of which voxels belong to the organ in the image.

The two model classifications can then be combined or stacked to determine image segmentation of the organ versus other image data. For example, CT intensity values are used together with the results from the convolutional and fully connected neural networks to build fully connected neural networks and/or gradient boosting machines (e.g., using 5×5 patches to generate 375 feature values, etc.). Stacking the network models can further increase dice (e.g., accuracy) scores (e.g., by 1-3%, etc.). The voxel segmenter 1140 provides the model classification outputs to the model stacker 1150 which combines or "stacks" the models for image segmentation.

Figure 18:
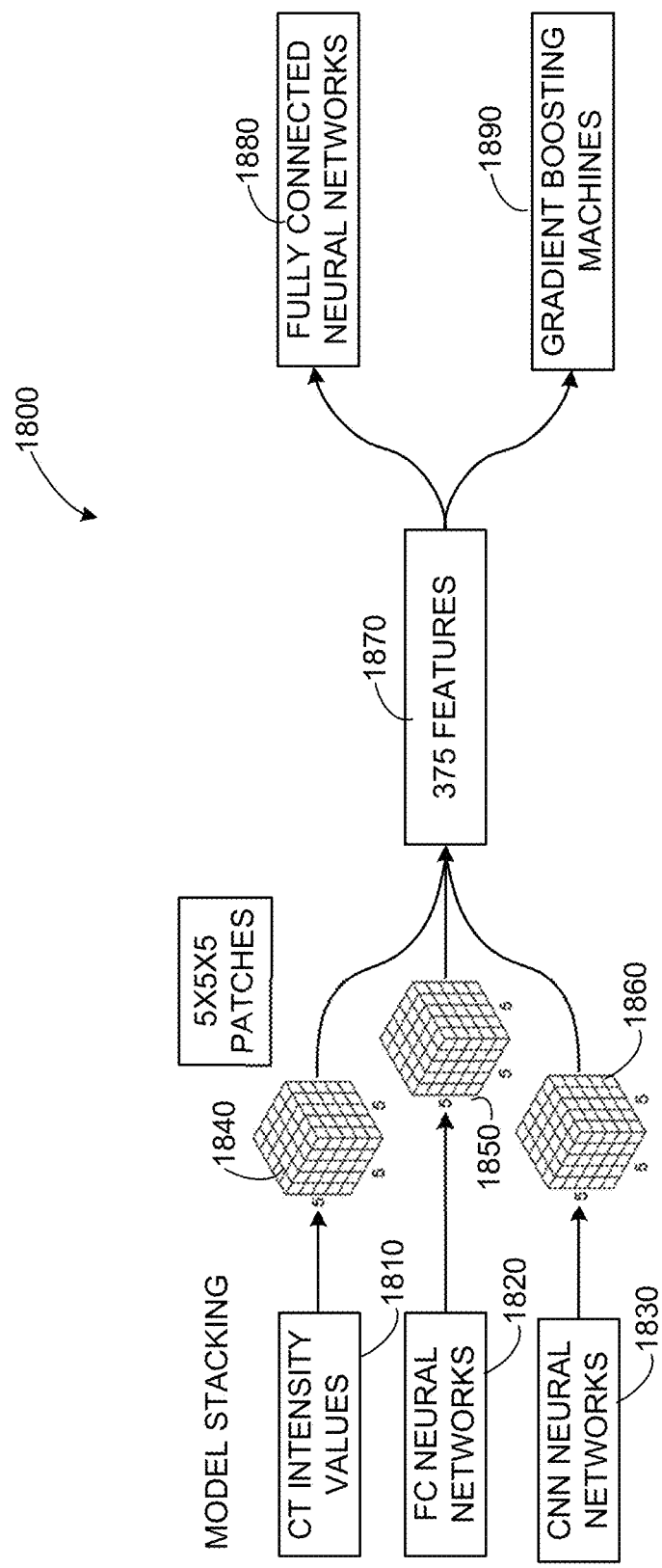
FIG. 18 illustrates an example model stacking system and methodology.

FIG. 18 illustrates an example model stacking system and methodology 1800 employed by the model stacker 1150 to output combined image segmentation information/classification. In the stacking phase, the best performing fully connected and convolutional neural network models are combined with the original image intensities to increase predictive power. Better performance is achieved since convolutional and fully connected networks are working quite differently, and the models used for stacking can combine the best parts of both models. In certain examples, fully connected neural networks (FCNs) and gradient boosting machines (GBMs) are combined.

First, models are selected for stacking. For example, two models are selected (e.g., one fully connected and one convolutional neural network, etc.). In certain examples, models with the best Dice (F1) scores are selected. In other examples, models with one or both having worse performance can be combined in stacking, with one model compensating for poor performance with certain data in the other model to reach better results in the aggregate with stacking. For example, if both models perform essentially the same (e.g., same organ regions learned correctly and misclassifications are similar), then stacking may provide minimal benefit. However, if two models are selected in which the misclassifications are different, then stacking can be more beneficial to correct errors, inconsistencies, etc.

As shown in the example of FIG. 18, CT intensity value(s) 1810, fully connected neural network model(s) 1820, and convolutional neural network model(s) 1830 are provided from the voxel segmenter 1140. Each model input 1810-1830 is modeled as a set of patches (e.g., a 5×5×5 3D cube of patches) 1840-1860.

Features 1870 are then created (e.g., extracted from three volumes such as original CT intensities, fully connected neural network prediction, convolutional neural network prediction, etc.). From each input volume 1810-1830, a cube-like region 1840-1860 centered around a voxel to be classified is extracted. The cube's side length is modifiable to produce a number of features (e.g., a 5×5×5 region produces 375 features, etc.) 1870. In certain examples, relative coordinates (e.g., points of the cube) can be used with normalization, where the bottom left coordinate (−2; −2; −2) points to a voxel −2 mm to the left, −2 mm towards the front and −2 mm down. In other examples, coordinates can be used without normalization such that CT x,y image spacing and slice thickness are ignored to select the voxel two steps to the left, front and bottom (e.g., providing the same result if the image has a resolution of 1 mm in all directions, etc.). One or more fully connected neural networks (FCNs) 1880 and gradient boosting machines (GBMs) 1890 is built from the extracted features 1870. The FCN 1880 and GBM 1890 can be used to model voxel information and segment the organ and/or other item of interest in the image data.

In certain examples, a training set can be selected for stacking. For example, both training and validation sets from CNN and FCN model data partitions can be used, or only validation sets from the CNN and FCN models can be used. The following was measured on the non-interpolated stacking models, in which the valid_*models were created using only the validation set while the train_*models used both the training and validation sets.

TABLE 1

Relative mean Dice difference compared to baseline model (train_gbm) measured on the test set:

| organ | train_gbm | train_nn | valid_gbm | valid_nn |
|---|---|---|---|---|
| brainstem | 100.00% | 100.26% | 99.94% | 100.20% |
| chiasm | 100.00% | 99.63% | 99.71% | 101.83% |
| mandib_gland | 100.00% | 99.92% | 99.73% | 98.94% |
| mandible | 100.00% | 99.81% | 99.35% | 98.93% |
| optic_nerve | 100.00% | 97.66% | 100.26% | 93.52% |
| parotid_gland | 100.00% | 100.04% | 100.03% | 98.38% |

TABLE 2

Relative median Dice difference compared to baseline model (train_gbm) measured on the test set:

| Organ | train_gbm | train_nn | valid_gbm | valid_nn |
|---|---|---|---|---|
| brainstem | 100.00% | 100.41% | 99.61% | 99.27% |
| chiasm | 100.00% | 98.69% | 99.34% | 99.67% |
| mandib_gland | 100.00% | 100.43% | 98.77% | 97.19% |
| mandible | 100.00% | 100.02% | 99.58% | 98.76% |
| optic_nerve | 100.00% | 101.85% | 101.54% | 96.52% |
| parotid_gland | 100.00% | 99.76% | 98.70% | 97.99% |

In certain examples, to identify the voxels to be used during training, the following formula can be used. First, all voxels are found in which any of the models contradicted the other (e.g., one classified the voxel as false and the other as true). Then, these voxels and their immediate neighbors (e.g., immediate six neighbors, etc.) are used together to train and evaluate test sets and stacked models. Thus, rather than stacking models for all voxels on which the CNN and FNN models are evaluated, only voxels of disagreement (and their immediate neighbors) can be evaluated, which shortens evaluation time, for example.

Models are trained (e.g., using the H2O framework's deeplearning and gbm functions, etc.). For example, GBM training can be performed with default parameters and using 5-folds cross validation. Fully connected neural network training can be executed using default parameters, but with a 5-layer deep network (e.g., each layer containing 64 nodes) and 5-fold cross validation.

In certain examples, more than two models can be used for stacking. Alternatively or in addition, other (e.g., non-machine learning, etc.) segmentation results can be incorporated as input for stacking. For example, an Atlas segmentation can be provided in conjunction with stacking. Convolutional neural network in stacking instead of FNNs and GBMs, for example. Input coordinates can be adjusted to provide a larger distance (bigger cube), 2.5 dimension (e.g., 3 planes, one along each axis), use a cloud as in the voxel-based segmentation, etc. Additional features can be included such as a voxel location compared to center of mass of the segmentation(s), a voxel location compared to anatomical landmarks, etc.

In certain examples, features extracted from the whole CT segmentation can be included to provide one or more value per input segmentation that are not voxel dependent. Thus, a volume of the positive segmented voxels (e.g., number of positive voxels*volume of a voxel) can be provided, and this value is relative to the average organ volume computed on gold standard or reference images. Alternatively or in addition, a sum of Hounsfield values over the positive segmented voxels divided by the number of voxels can provide a value relative to the average of this value computed on the gold standards.

In certain examples, probabilities can be used instead of or in addition to the binary classification results of the CNN and FNN models (e.g., true or false). In certain examples, sub-optimal models can be as input for stacking, instead of models having the best dice scores. In certain examples, models that have learned different parts of the problem correctly can be used in combination so that models that make different kinds of misclassifications can be used as input for stacking.

Thus, machine learning methods can provide comparable results compared to traditional image processing in segmentation tasks even on a limited data set. Additional data can further improve performance and robustness. A bottleneck is the availability of manually contoured training data. Feedback obtained from manual user corrections of contours can be used to improve the models and the segmentation tool.

The model stacker 1150 provides combined voxel classification information, model(s), segmented image data, etc., to the output imager 1160. The output imager 1160 generates an output image, such as an image with the organ and/or other object of interest identified in the output image, etc. The output imager 1160 can provide object of interest information to a radiation therapy planner to determine radiation location and dosage information for radiotherapy and/or other treatment involving the organ and/or other object of interest, for example. The output imager 1160 can generate a radiation dose calculation itself based on the model and classification information from the model stacker 1150, voxel segmenter 1140, etc., for example. The output imager 1160 can provide an annotated image showing an organ and associated radiation planning information such as position, dose, period of exposure, etc., for example.

While example implementations are illustrated in conjunction with FIGS. 1-18, elements, processes and/or devices illustrated in conjunction with FIGS. 1-18 may be combined, divided, re-arranged, omitted, eliminated and/or implemented in any other way. Further, components disclosed and described herein can be implemented by hardware, machine readable instructions, software, firmware and/or any combination of hardware, machine readable instructions, software and/or firmware. Thus, for example, components disclosed and described herein can be implemented by analog and/or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the components is/are hereby expressly defined to include a tangible computer readable storage device or storage disk such as a memory, a digital versatile disk (DVD), a compact disk (CD), a Blu-ray disk, etc. storing the software and/or firmware.

Figure 19:
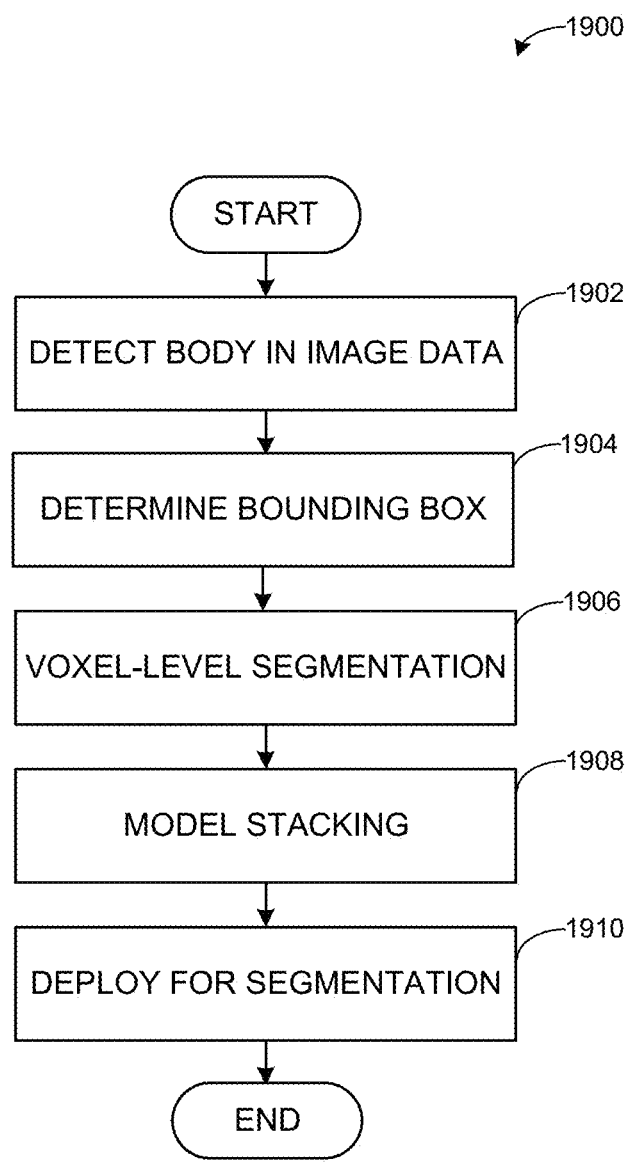
FIG. 19 illustrates a flow diagram of an example method for machine learning image segmentation.

Flowcharts representative of example machine readable instructions for implementing components disclosed and described herein are shown in conjunction with at least FIG. 19. In the examples, the machine readable instructions include a program for execution by a processor such as the processor 3012 shown in the example processor platform 3000 discussed below in connection with FIG. 30. The program may be embodied in machine readable instructions stored on a tangible computer readable storage medium such as a CD-ROM, a floppy disk, a hard drive, a digital versatile disk (DVD), a Blu-ray disk, or a memory associated with the processor 3012, but the entire program and/or parts thereof could alternatively be executed by a device other than the processor 3012 and/or embodied in firmware or dedicated hardware. Further, although the example program is described with reference to the flowcharts illustrated in conjunction with at least FIG. 19, many other methods of implementing the components disclosed and described herein may alternatively be used. For example, the order of execution of the blocks may be changed, and/or some of the blocks described may be changed, eliminated, or combined. Although the flowcharts of at least FIG. 19 depict example operations in an illustrated order, these operations are not exhaustive and are not limited to the illustrated order. In addition, various changes and modifications may be made by one skilled in the art within the spirit and scope of the disclosure. For example, blocks illustrated in the flowchart may be performed in an alternative order or may be performed in parallel.

As mentioned above, the example processes of at least FIG. 19 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of at least FIG. 19 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. In addition, the term "including" is open-ended in the same manner as the term "comprising" is open-ended.

As shown in the example method 1900 depicted in FIG. 19, acquired image data can be analyzed and segmented to identify one or more organs and/or other region(s) of interest in the image data. At block 1902, the body is detected in the image data. As described above, irrelevant parts of the image are excluded using slice segmentation and analysis to identify the body in which the organ and/or other region of interest lies. At block 1904, a bounding box is formed around the organ or other region of interest identified in the image data. At block 1906, voxel-level segmentation is used to process image data within the bounding box. As described above, a plurality of methods using a corresponding plurality of models use voxels, patches, etc., to segment the image data in the bounding box and form voxel models of the image data. At block 1908, the models are stacked or combined. For example, as described above, the models can be combined with image intensity values to form a composite model of image voxel information. At block 1910, the resulting composite model can be deployed for image segmentation and further processing.

Thus, certain examples identify what to classify in an image (e.g., regions), as well as what features are used to classify the regions (e.g., size, location, ratio of air pixels, etc.), and efficient calculation of those features.

In certain examples, a typical CT image includes 512 rows×512 columns×300 slices, and any voxel can be used for training. However, only a subset of pixels/voxels can be processed at a given time. Rather than random sampling, a higher sampling probability can be assigned to more interesting voxels. For example, a variety of sampling techniques can be used. In one example, a Manhattan distance is calculated for each voxel within a 20 step distance. Multiple possible sampling techniques can be used. If skip edge 1 is used, it skips all the voxels that have a neighboring voxel with different color (positive/negative) and aims to correct small contouring inconsistencies across. If oversample edge 2 is used, it oversamples voxels that are next to an edge 1 voxel, but not in edge 1, and aims to learn a contour that is likely correct (no mistakes in gold). If probability sampling is used, it randomly samples from voxels based with a distance based probability (e.g., probability=10/distance). In certain examples, distance-based sampling can be used.

Thus, in certain examples, an input image (e.g., CT, X-ray, MICT, etc.) volume can be processed slice-by-slice in a plurality of directions (e.g., axial, coronal, and sagittal) and deep learning can be applied to classify the slices depending on whether the slices include a target organ. The deep learning network can be applied to process data from the axial, coronal, and sagittal image slices. In certain examples, the axial image processing is centered in the z direction on a center of mass of the whole patient, while the coronal and sagittal slices are centered in the z direction to the center of the detected organ. By obtaining the organ location in all 3 directions, the information can be combined to a bounding box around the organ location. For paired organs (e.g., eyeballs, etc.), two regions of similar size can be fit for the sagittal slices, resulting in two bounding boxes, for example.

Figure 20:
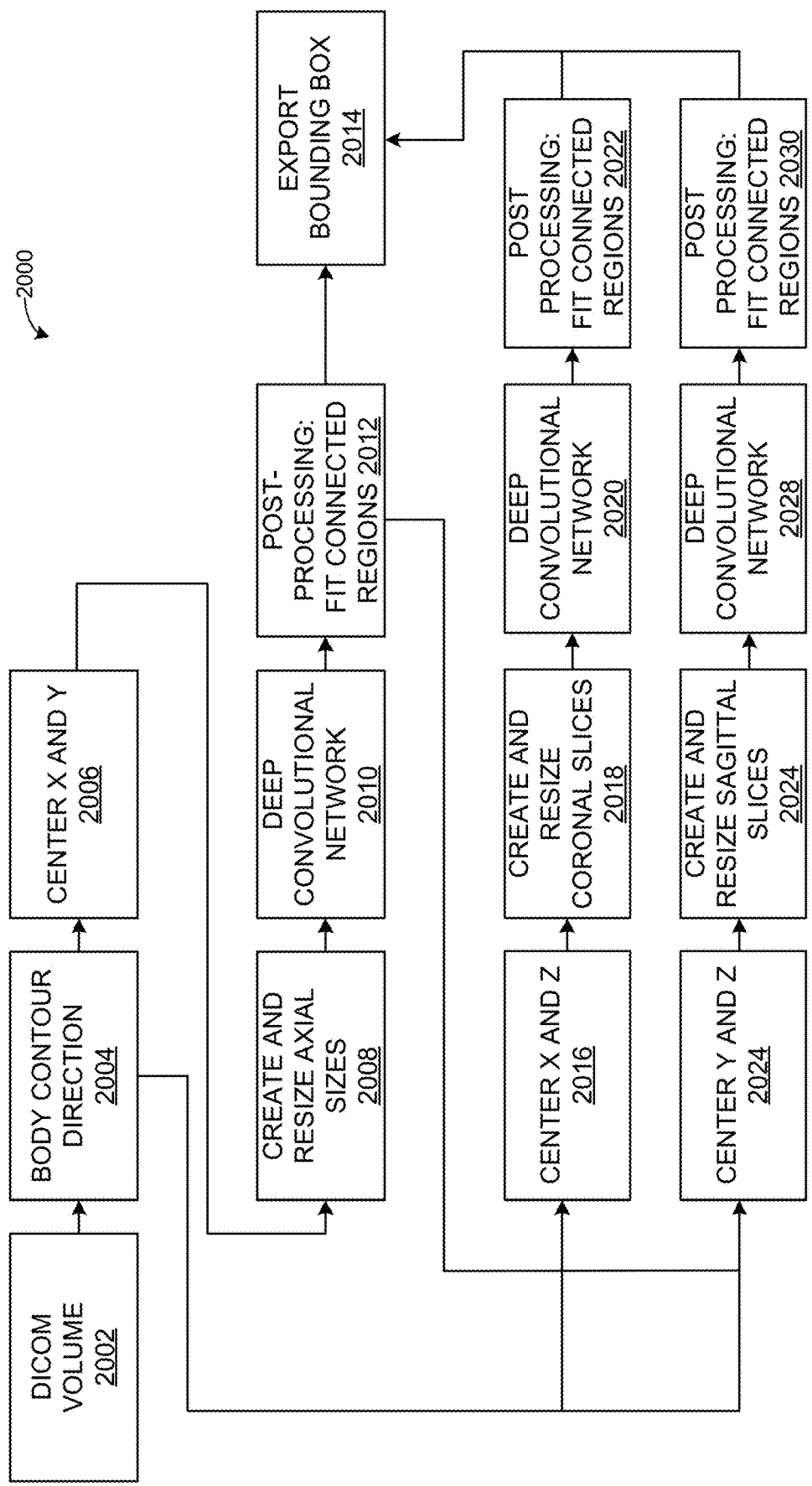
FIG. 20 illustrates a flow diagram of an example process to determine organ location and generate a bounding box around the organ location.

FIG. 20 illustrates an example process 2000 to determine organ location and generate a bounding box around the organ location. At block 2002, a DICOM image volume (e.g., a DICOM CT image volume, etc.) is received for processing. Any organ and/or other item of interest in any type of rectangular or square 3D volume can be detected using the example process 2000.

At block 2004, a body contour and orientation/direction are determined from the image volume data. At block 2006, the body contour is centered in the x and y directions and provided, at block 2008, to create and resize axial slices. At block 2010, the axial slices are provided as input to a deep convolutional network for processing, correlation, etc. At block 2012, an output of the deep learning network (DLN) is post-processed to fit connected regions to form all or part of a bounding box. At block 2014, the bounding box can be exported.

At block 2016, the body contour and direction information are also provided to center the body contour in the x and z directions. At block 2018, coronal slices are created and resized. At block 2020, the coronal slices are provided as input to a deep convolutional network for processing, correlation, etc. At block 2022, an output of the deep convolutional network is post-processed to fit connected regions to form all or part of a bounding box. At block 2014, the bounding box can be exported.

At block 2024, the body contour and direction information are also provided to center the body contour in the x and z directions. At block 2026, sagittal slices are created and resized. At block 2028, the sagittal slices are provided as input to a deep convolutional network for processing, correlation, etc. At block 2030, an output of the deep convolutional network is post-processed to fit connected regions to form all or part of a bounding box. At block 2014, the bounding box can be exported.

Thus, at block 2014, bounding box information can be combined from axial, coronal, and sagittal image processing to form one or more bounding boxes for export and further segmentation processing. In certain examples, the deep convolutional network model is trained using "ground truth" bounding boxes determined for a plurality of input images. An example bounding box detection output is shown in FIG. 21.

Figure 22:
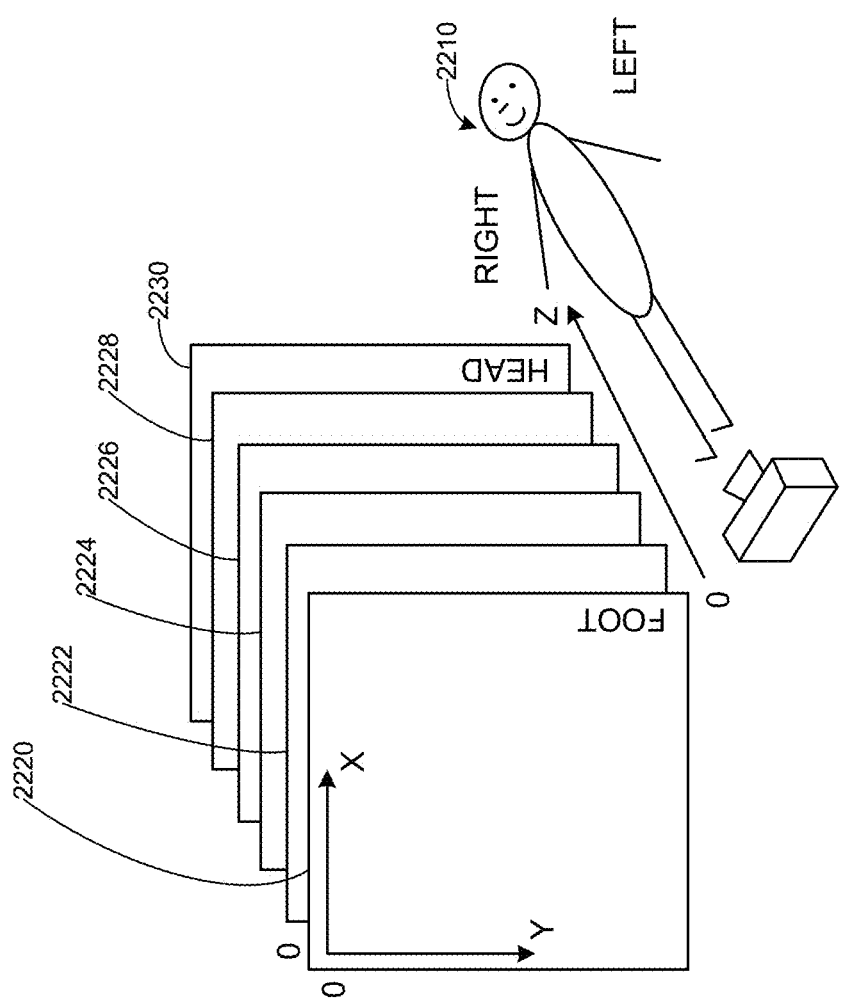
FIG. 22 depicts an example definition of x, y, and z coordinates with respect to a patient to be imaged.

In certain examples, coordinates x,y,z follow DICOM standard directions. The image volume is assumed to include axial slices with an Image Orientation (Patient) (0×0020,0× 0037) of 1/0/0/0/1/0. In this case, the axes of the volume are aligned with x, y, and z. Organ boundary locations are given in voxels of the input volume, with indexing starting from zero, as shown in the example of FIG. 22. The "low" and "high" values are both inclusive, so z_low and z_high (such as shown in the example of FIG. 21) give the first and last axial slice on which the organ is present respectively. In addition, the position of the organ edges is also given in mm-s compared to the center of the (0, 0, 0) voxel: x_low_mm=pixel_spacing_x*x_low. As shown in the example of FIG. 22, x, y, and z coordinates can be defined with respect to a patient 2210 and a series of image slices 2220-2230 obtained from foot to head along the z axis with respect to the patient 2210.

Preprocessing prepares standardized CT slice images for classification. As described above, detection of the body contour in the image begins the preprocessing. A plurality of classifiers (e.g., 3 different (although similar) classifiers, etc.) are trained, each with an associated direction (e.g., x, y, z, etc.). For each selected direction, original slices in the given direction are extracted from the rectangular volume. Without resampling, the number of extracted slices equals the size of the input volume in the particular direction, and each slice is resized to a standard size. The standard size can be configurable such as 64×64 pixels covering 30 cm×30 cm area, etc.

To increase robustness of the detection, the target anatomy/object is centered within the slices. In the x and y directions, the slice center is aligned with the patient anatomy's center of mass (assuming homogeneous density within the body), and, in the z direction, the slice center is aligned with the center of the detected organ location based on the axial slices. In some examples, before preprocessing, the sagittal slices are often distorted because the spacing between slices is often different from the pixel spacing within a slice.

The axial slices are centered according to the center of mass of the whole patient. For example, the head may be elevated compared to the rest of the body, so the head is shifted towards the top of the axial slice and towards the left of the sagittal slice. This shift can be avoided by centering according to the center of mass of the given slice only for the axial view and by centering on the center of mass of the detected axial region for the coronal and sagittal views.

In certain examples, rather than using one slice as input, the classifier can use several slices with a given offset (e.g., in mm) from the target slice in order to have information for the classifier decision. If the given distance from the target slice falls between slices, then linear interpolation is used between the two neighboring slices.

Thus, preprocessing parameters can be expressed in terms of minimum and maximum values, target size in centimeters, target size in pixels, layer offset in millimeters, etc. Preprocessing parameters can be stored as a JavaScript Object Notation (JSON) object, for example.

Figure 23:
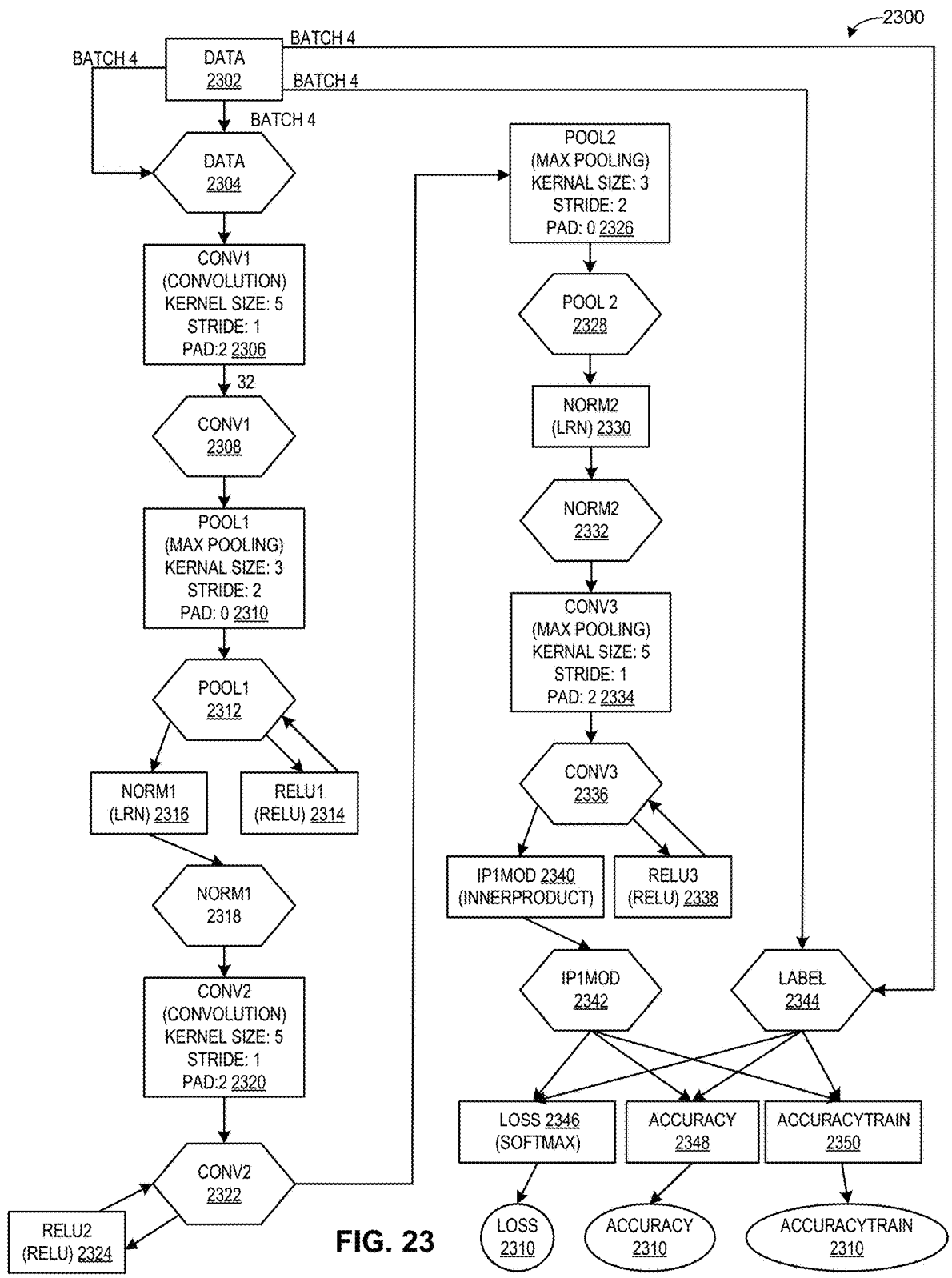
FIGS. 23-24 illustrate example deep learning network architectures for classification of input images.

FIG. 23 illustrates an example network architecture 2300 for a deep convolutional network that can be used as a binary classifier for input images. In the example DLN 2300, input data 2302 is batched to be distributed for processing and labeling in the network 2300. Batch(es) of the data 2302 are organized 2304 for convolution 2308 according to certain convolution parameters 2306. The output is then pooled (e.g., max pooling, etc.) 2312 according to pooling parameters 2310. Pooling output is rectified by a ReLU 2314 and normalized 2318 by a normalizer (e.g., using local response normalization (LRN), etc.) 2316.

A second convolution layer 2322 processes the output data according to convolution parameters 2320 is also rectified by a ReLU 2324, and output from the convolution layer 2322 is provided to a second pooling layer 2328 according to pooling parameters 2326, and the pooled output is normalized 2332 according to LRN parameters 2330. A third convolution layer 2336 processed the normalized data according to convolution parameters 2334, which is rectified by a ReLU 2338 and an inner product modifier 2340 performing an inner product modification 2342 of the convolution 2336 output. Output from the inner product modification 2342 is combined with label 2344 data to generate loss 2346 (e.g., a softmax loss determined via a softmax function, etc.), accuracy 2348, and accuracy training 2350 information. This information can be output 2352, 2354, 2356 from the network 2300.

The loss 2352 and accuracy 2354 output can feed into slice identification and processing, and the accuracy training output 2356 can be used to update and/or otherwise further train the DLN model, for example. In certain examples, another training parameter is a "Weight Decay" (e.g., weight_decay=0.001, etc.). The weight decay controls regularization of the DLN model. If the weight decay is too small, then the model may tend to overfit the data and, therefore, have a good accuracy on training examples but much poorer accuracy on a cross-validation dataset. If weight decay is too high, then the model may not converge to a good fit on the training data at all. Thus, if weight decay is increased, then the training accuracy will monotonously decrease, but the cross-validation accuracy will increase up to a given point and then decrease. An optimal point is given by maximum cross-validation accuracy, for example.

The network 2300 output can be used by the classifier to predict, for each slice, whether the organ/item of interest is present or not in the given slice, resulting in a vector of 0-s and 1-s along each axis (e.g., x, y, and z). In some examples, a single organ is being detected, so, in post-processing, a curve can be fit to the output vector that is 1 in a single connected region and 0 elsewhere. A merit function can be defined to select the best fit, which is the number of points where the fitted curve equals the original vector minus the number of points where the fitted curve and the original vector are different. Constraints can be applied to the fit, such as minimum and maximum sizes of the fitted region specified as input parameters. For paired organs, limits can be specified with respect to the size of the gap between the organs. Example post-processing parameters include minimum size (e.g., in mm, etc.), maximum size (e.g., in mm, etc.), minimum distance (e.g., in mm, etc.), and maximum distance (e.g., in mm, etc.).

In certain examples, a selected fit is the fit that provides the highest merit score within the constraints. In case of equal scores, the fit with the larger size is selected to give higher confidence that indeed the organ is within the fitted region. With paired organs, two connected regions of similar size are fit to the input vector. In this case, the cost function is modified to penalize size differences between the two regions. For example, the difference in the size of the two fitted regions is multiplied by 0.5 and then subtracted from the score. Results can then be evaluated after post-processing according to Equations 1-3 described above.

Figure 24:
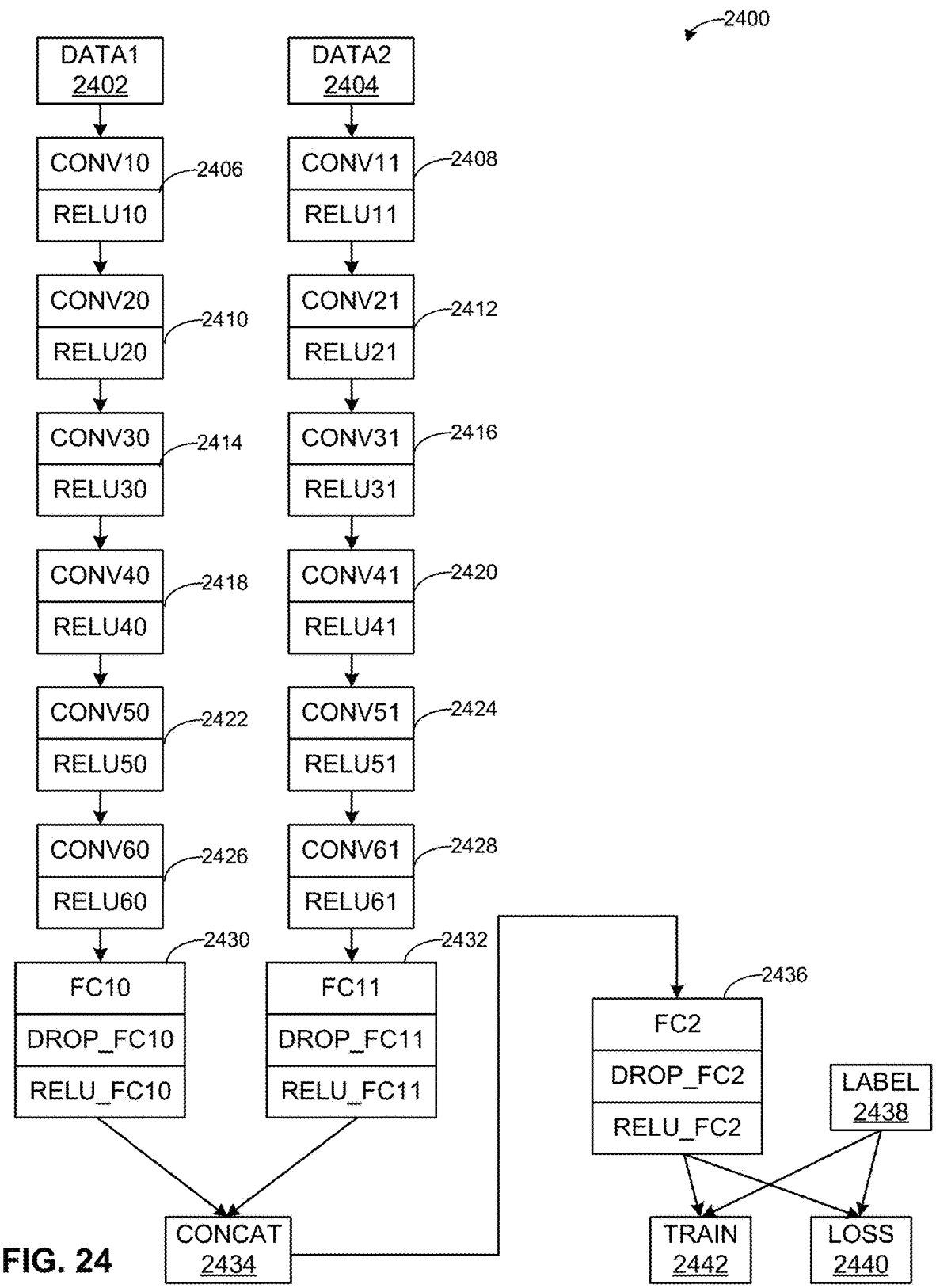

FIG. 24 provides an alternative network 2400 design in which two data inputs 2402, 2404 are provided for a series of convolutions and rectifications 2406-2428 to fully connected layers 2430, 2432 including dropouts and rectifiers. Outputs from the fully connected layers 2430, 2432 are concatenated 2434 and provided to another fully connected layer 2436 whose output is combined with labels 2438 to generate loss 2440 and training 2442 information.

Additionally, as described above, certain examples provide automated image segmentation of the image data to identify the body contour and remove other items in the image data, such as a patient positioning table on which the patient is positioned for the image acquisition. During CT image acquisition, for example, the patient is located on a moving table that is also visible in the image when the reconstructed field of view (FOV) is greater than 35 cm. Since some part of the table has similar density as the human body, the presence of the table is a disturbing factor for automated segmentation methods. As described above, the table, tubes, cables, etc., can be removed from fully FOV CT images to provide a more accurate volume of interest for medical image processing, such as segmentation of organs, detection of anatomy landmarks or regions, etc. For example, an input CT image can be processed slice-by-slice to extract closed objects in the image and classify those objects into body, table, and/or other type using machine learning. The deep learning and/or other machine learning network can be trained on segmented reference or "truthed" images processed to remove regions and/or items in the image not belonging to the patient body being imaged.

For example, a verified training image can be created by segmenting the image into air and non-air components using automated thresholding. Then, the regions not belonging to the body are manually erased. Finally, the air cavities inside the body are filled (e.g., using a 2D cavity-filling algorithm, etc.). 2D morphology can be applied to erode and dilate the image to separate body from table and/or other object in the image, for example. Image components are then separated and labeled so that non-body components can be erased and/or otherwise removed.

Once non-air components have been segmented from air in the image, the non-air components are classified into foreground (body) and background (other) classes. In certain examples, classification is based on one or more following numerical features (which are computed for non-air components) including:

size: area of the region (in mm2)
cx, cy: X, Y displacement of the region's weight center from image center (mm), where image center is defined by the center of the reconstructed FOV
wx, wy: X, Y displacement of the region's weight center from body center (mm), where body center is the weight center of all non-air voxels averaged for all slices
wdst: distance of the region's weight center from body center (mm)
air: ratio of air voxels (density<−300 HU) inside the region (%)
fat: ratio of fat voxels (−300≤density<−40 HU) inside the region (%)
soft: ratio of soft-tissue voxels (−40≤density<300 HU) inside the region (%)
bone: ratio of bone voxels (300≤density) inside the region (%)
entr: entropy of density: −air/log 2(air)−fat/log 2(fat)−soft/log 2(soft)−bone/log 2(bone)
mdst: largest 2D thickness of the region (mm)
adst: average 2D thickness of the region (mm)
bx, by: width and height of the bounding box of the region (mm)
bratio: ratio of bx and by In certain examples, to compute adst and mdst features efficiently, a 2D distance map is computed with respect to the contour of the non-air components (for each slice, separately). Thus, a maximum and an average of the distance map are taken inside a region to define the value of these two features, respectively.

In certain examples, a sequential minimal optimization (SMO) algorithm (e.g., with a linear kernel, etc.) is used to train a (binary) support vector machine (SVM) classifier, implemented using a machine learning toolset (e.g., Weka, etc.). The training database can be split for training and testing/evaluation (e.g., use 66% of the instances for training and the 34% for evaluation, etc.).

The SVM model is applied to each non-air region from the image, and, if the region is rated to not belong to the patient body, then voxels belonging to that region are removed from a mask for the image. In certain examples, gaps between slices in the z direction are filled or removed to help ensure that the resulting image is continuous in the z direction.

Certain examples provide a semantic segmentation (e.g., pixel-wise classification) of image data to label each pixel and segment the image into regions corresponding to sets of labels. Similarly, each voxel can be classified according to a region of interest to which it belongs. An example classifier can process image data on a voxel-by-voxel level to provide an output for each voxel based on its neighboring voxels and classify an entire image slice in a single action.

Figure 25:
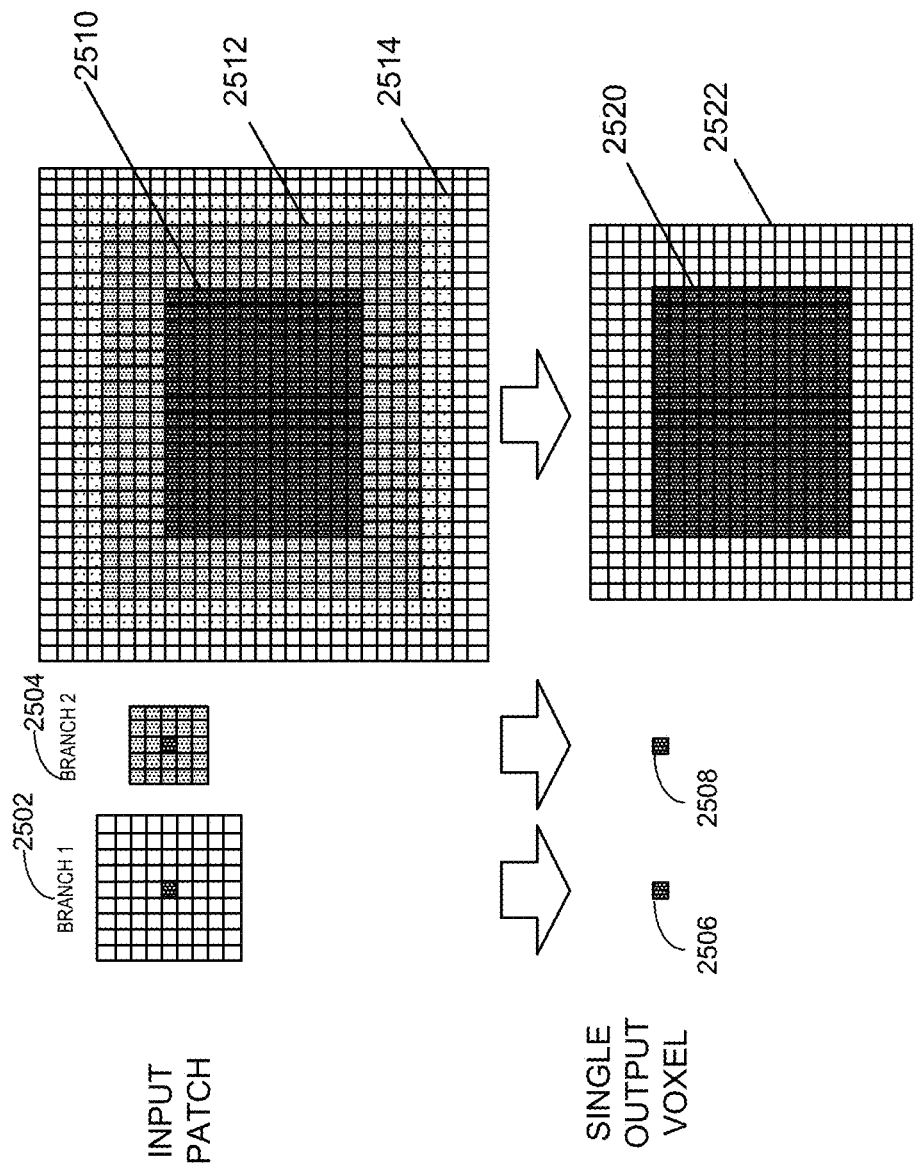
FIGS. 25-26 illustrate image slice classification approaches.

In some examples, padding is added in a first convolution based on an input size, and voxels affected by the padding are removed from the final result. As shown in the example of FIG. 25, a plurality of input patches 2502, 2504 are provided for training to each produce a single output voxel 2506, 2508. The classifier can then be deployed to classify an entire region of interest (ROI) 2510, such as a full slice or bounding box with a margin for imprecision. Neighboring voxels 2512 are added to enable correct classification of the ROI 2510, and further padding 2514 can be added by the DLN to maintain a certain image size (e.g., depending on branch input size, etc.). A classified region of interest 2520 is output along with a margin of classified voxels 2522 affected by the padding, which can then be removed around the classified ROI 2520, for example.

Figure 26:
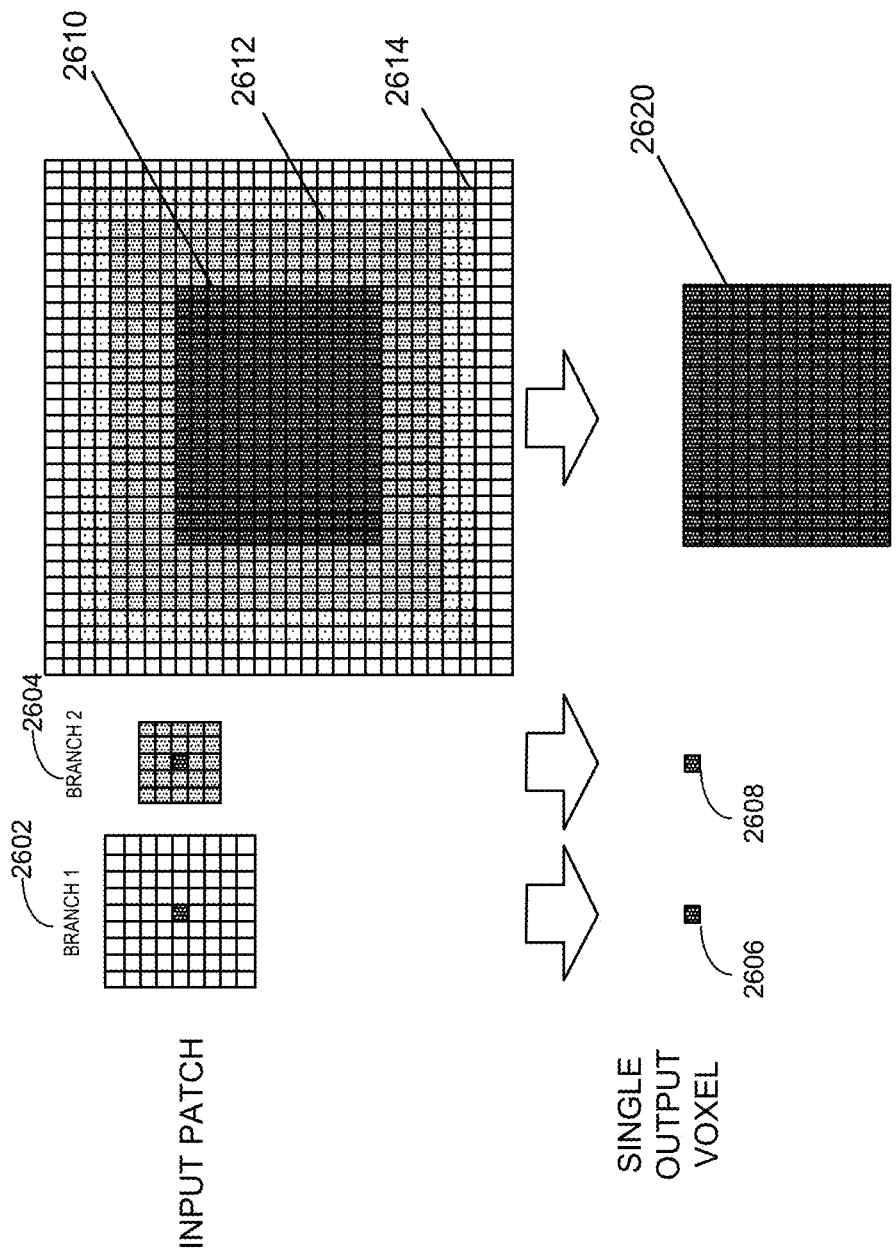

FIG. 26 illustrates another classification approach that adds padding as needed for the branch with the largest input and applies cropping on branches that call for smaller inputs. As shown in the example of FIG. 26, a plurality of input patches 2602, 2604 are provided for training to each produce a single output voxel 2606, 2608. The classifier can then be deployed to classify an entire region of interest (ROI) 2610, such as a full slice or bounding box with a margin for imprecision. Neighboring voxels 2612 are added to enable correct classification of the ROI 2610. Further padding 2614 can be added and/or some voxels cropped from the edge depending on branch input size so that all branches give the same output size, for example. A classified region of interest 2620 is output.

Thus, certain examples automate 3D medical imaging processing through axial and/or other slice classification using deep learning with quantitative and qualitative analysis. Through the medical image segmentation framework described herein, a clinical relevant portion of an image can be detected and other image portion(s) excluded, reducing processing time significantly by reducing input data size, etc. The example framework detects anatomy regions involved in an image (e.g., using anatomy landmarks in the image) and enables content-based medical image processing using the anatomy detection, for example. Bounding box(es) defining organ and/or other item locations can be used to reduce runtime and improve accuracy of organ/item segmentation algorithms. In organ segmentation, organ contours can be made ready for clinical use with less or no user interaction. Thus, organ-specific analysis and therapy planning can be facilitated.

In certain examples, a labelled image database of image portions can be generated for training, application, and/or other reference/comparison. Coverage can include whole body, torso, particular object/organ/region, etc. Representative patients can vary by gender, weight/obesity, supine position, etc. Database image information can also vary by clinical area such as neurology, angiography, cardiology, colonoscopy, surgery, oncology, etc. Examples at different image quality can be stored, affected as normal, noisy, artifacts, implants, catheter, contrast, etc. In certain examples, separate image database(s) can be used for training, cross-validation, and testing to generate a deployed model for application to new image data. Training exams can be normalized (e.g., center the body/anatomy, crop the image, resample, adjust intensity, etc.) and augmented (e.g., rotate, etc.).

Figure 27:
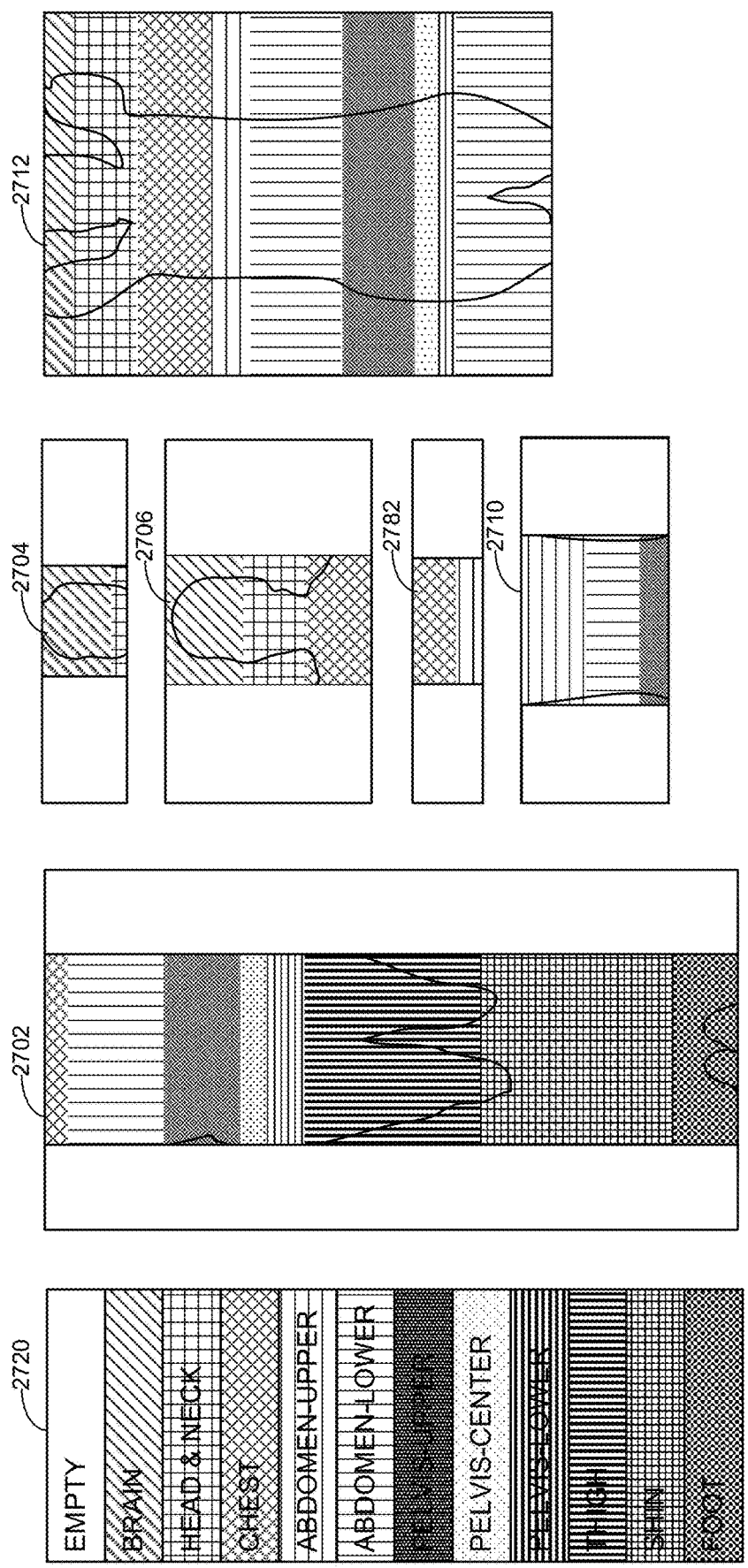
FIG. 27 shows example image labelling.

FIG. 27 shows example image labelling in which portions of each image 2702-2712 are associated with an appropriate label 2720 identifying the anatomy, organ, region, or object of interest (e.g., brain, head (and neck), chest, upper abdomen, lower abdomen, upper pelvis, center pelvis, lower pelvis, thigh, shin, foot, etc.).

FIG. 28 illustrates an example correction of a misclassified slice in an image. For example, a slice-by-slice output 2810 of a convolutional neural network is mapped to an image 2820. As shown in the example of FIG. 28, a slice 2830 appears incorrect in the image and maps to an entry 2835 in the CNN output 2810, which is generated based on the correlation of greatest confidence but may result in having to manually alter a labeling such as 2835. However, by applying post-processing, as described above, to establish coherent labeling based on a known sequence of regions and provide minimal or reduced cost continuous labeling, a CNN output 2840 and resulting image 2850 reduce or avoid mis-classified slices, for example.

Figure 29:
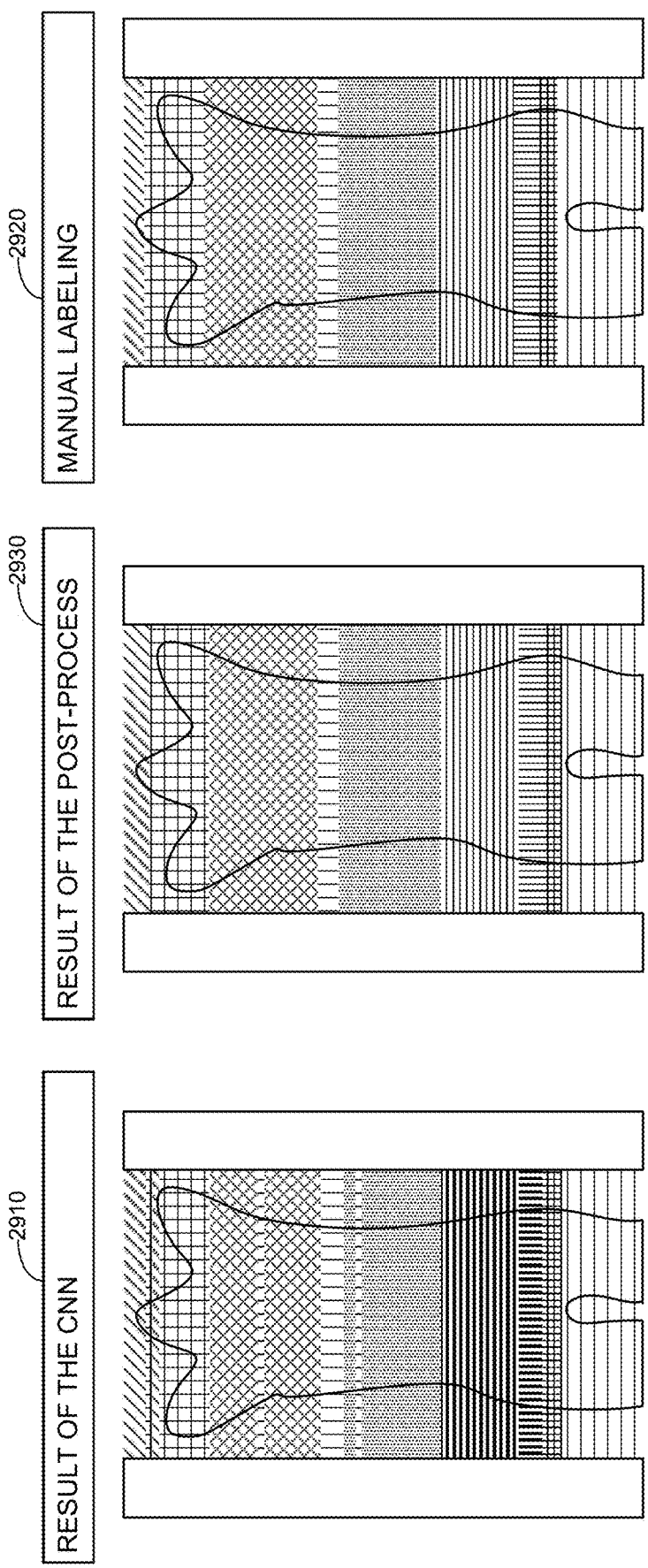
FIG. 29 shows an example comparison between a convolutional neural network image, a post-processed image from a convolutional neural network, and a manually labelled image.

The example of FIG. 29 further demonstrates the benefits of the post-processing described herein. While the result of the CNN 2910 differs from the manually labeled image 2920, the post-processed image 2930 aligns with the manually labeled image and is able to achieve the result more consistently, more accurately, faster, and in response to urgent patient care needs for health and safety compared to a manual reading and labeling of image parts on film by a radiology, for example.

Thus, certain examples incorporate a plurality of imaging views and positions (e.g., rotated images, patients in positions other than supine, etc.) in neural network training to deploy an improved deep learning network model able to understand and process a wider variety of images and account for more errors and/or imperfections in image acquisition. Additionally, images with small reconstruction diameter are included in training to enable the deployed model to handle localized imaging scans. In certain examples, technologies such as slice sub-sampling, image resolution reduction, etc., can be used to accelerate image processing for segmentation and identification.

As described above, automated image segmentation can drive radiotherapy planning at least in part through radiation dosage to target a tumor identified in the image while minimizing dosage to nearby radiosensitive organs. Rather than hours of tedious manual work, the imaging, processing, and segmentation technologies driven by computer and by imaging modality are improved to enable quick, accurate, and reproducible image processing, tumor and/or other organ identification, and radiation therapy planning to improve patient health and protect patient safety, for example.

Certain examples, as described above, employ a hierarchical approach to a) detect a body contour and remove other items; b) generate a bounding box around an item (e.g., an organ, tumor, etc.) of interest, and c) classify, at the voxel level, image data within the bounding box to identify the item of interest. Such classification is executed in two layers to leverage two models which are then combined through model stacking. The models can vary depending upon imaging modality, item of interest, patient, condition, etc.

In certain examples, the example process begins with the largest structures and works down into smaller and smaller details inside the image. For example, a table and/or other object can be removed from an image of a patient by, rather than volume- or pixel-based segmentation, segmenting each image slice including foreground and background portions, in which foreground objects are then classified into 1) body and 2) other objects using a deep learning or other machine learning classifier. From the body object(s), a trained binary classifier (e.g., a CNN binary classifier, etc.) identifies a particular organ and/or other item of interest using a plurality of slices in a plurality of directions (e.g., three slices, one each from the axial, coronal, and sagittal views, etc.) to be classified and combined to form a bounding box around the item from the plurality of views. Within the bounding box, voxels are analyzed to segment the voxels and determine whether or not the voxel forms part of the organ/item of interest. Multiple models are applied and stacked to determine the final classification result, which can be output to a display, to a report, to a patient electronic medical record, to a surgical planning tool, to a radiation dosage calculator, to a multidisciplinary team (MDT) collaboration interface, etc., to drive improved medical system operation, patient care, and patient health and safety, for example.

In certain examples, the bounding box classifier is trained using a database of positive and negative classification results with some slices augmented (e.g., rotate, translate, etc.), some slices not augmented, some slices duplicated, etc., to learn generic and particular image features, etc. In addition to a particular slice being processed, parallel slices above and below that slice can be evaluated, for example. Since the bounding box is 100-1000 times smaller than the original image volume, processing of the bounding box is much quicker and less prone to errors than processing of the entire original image volume, for example.

In certain examples, the voxel segmentation model can be trained to look at voxel location as well as neighboring voxels, voxel brightness, etc. Certain examples provide a cloud-shaped model to look at a target voxel and neighboring voxels such as predefined but random neighboring voxels. Using such a model, a few target voxels (e.g., 100, 150, 200, etc.) can provide an understanding of what is in an image and extract feature(s) to train the learning network. A middle voxel in a group or neighborhood of voxels can be classified to determine whether the voxel is in an organ within the bounding box, and/or patches of image data can be taken around an organ and processed by a CNN with a limited number of parameters to characterize the region (e.g., 1 cm, 3 cm, and 5 cm around the target voxel and three different patch sizes combined at the end, etc.), for example. Classification outputs from a plurality of models are combined via model stacking to determine which voxels belong to an organ and/or other target, for example.

While some examples have been shown and described with respect to CT images, the same systems and methods can be applied to MR, x-ray, MICT, ultrasound, etc. In some examples, modalities can be combined such as applying a CT model to MR images, etc.

Figure 30:
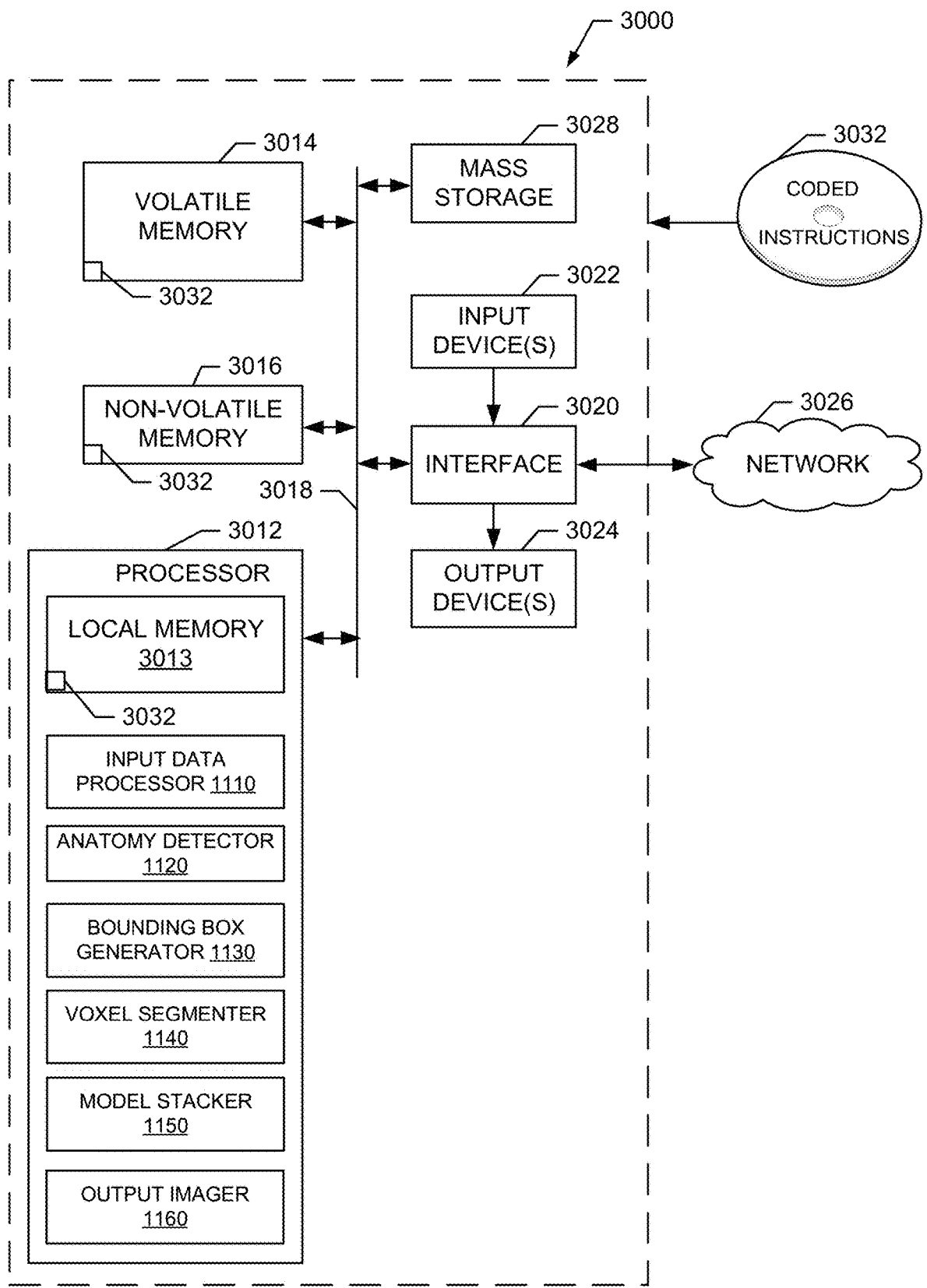
FIG. 30 is a block diagram of a processor platform structured to execute the example machine readable instructions to implement components disclosed and described herein.

FIG. 30 is a block diagram of an example processor platform 3000 structured to executing the instructions of at least FIG. 19 to implement the example components disclosed and described herein. The processor platform 3000 can be, for example, a server, a personal computer, a mobile device (e.g., a cell phone, a smart phone, a tablet such as an iPad™), a personal digital assistant (PDA), an Internet appliance, or any other type of computing device.

The processor platform 3000 of the illustrated example includes a processor 3012. The processor 3012 of the illustrated example is hardware. For example, the processor 3012 can be implemented by integrated circuits, logic circuits, microprocessors or controllers from any desired family or manufacturer.

The processor 3012 of the illustrated example includes a local memory 3013 (e.g., a cache). The example processor 3012 of FIG. 30 executes the instructions of at least FIG. 19 to implement the systems and infrastructure and associated methods of FIGS. 1-18 such as the example input data processor 1110, the example anatomy detector 1120, the example bounding box generator 1130, the example voxel segmenter 1140, the example model stacker 1150, the example output imager 1160, or, more generally, the example segmentation processing system 1100, etc. The processor 3012 of the illustrated example is in communication with a main memory including a volatile memory 3014 and a non-volatile memory 3016 via a bus 3018. The volatile memory 3014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 3016 may be implemented by flash memory and/or any other desired type of memory device. Access to the main memory 3014, 3016 is controlled by a clock controller.

The processor platform 3000 of the illustrated example also includes an interface circuit 3020. The interface circuit 3020 may be implemented by any type of interface standard, such as an Ethernet interface, a universal serial bus (USB), and/or a PCI express interface.

In the illustrated example, one or more input devices 3022 are connected to the interface circuit 3020. The input device(s) 3022 permit(s) a user to enter data and commands into the processor 3012. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 3024 are also connected to the interface circuit 3020 of the illustrated example. The output devices 3024 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 3020 of the illustrated example, thus, typically includes a graphics driver card, a graphics driver chip or a graphics driver processor.

The interface circuit 3020 of the illustrated example also includes a communication device such as a transmitter, a receiver, a transceiver, a modem and/or network interface card to facilitate exchange of data with external machines (e.g., computing devices of any kind) via a network 3026 (e.g., an Ethernet connection, a digital subscriber line (DSL), a telephone line, coaxial cable, a cellular telephone system, etc.).

The processor platform 3000 of the illustrated example also includes one or more mass storage devices 3028 for storing software and/or data. Examples of such mass storage devices 3028 include floppy disk drives, hard drive disks, compact disk drives, Blu-ray disk drives, RAID systems, and digital versatile disk (DVD) drives.

The coded instructions 3032 of FIG. 30 may be stored in the mass storage device 3028, in the volatile memory 3014, in the non-volatile memory 3016, and/or on a removable tangible computer readable storage medium such as a CD or DVD.

From the foregoing, it will be appreciated that the above disclosed methods, apparatus, and articles of manufacture have been disclosed to monitor, process, and improve operation of imaging and/or other healthcare systems using a plurality of deep learning and/or other machine learning techniques.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An image data processing system comprising:
an anatomy detector to detect an anatomy in an image and to remove items not included in the anatomy from the image using a first machine learning model to identify a region of interest in the anatomy or including the anatomy;
a bounding box generator to generate a bounding box around the region of interest using a second machine learning model and to provide image data within the bounding box;
a voxel-level segmenter to classify the image data within the bounding box at the voxel level using at least two models including a third machine learning model to identify an object in the region of interest;
a model stacker to combine a plurality of models including the at least two models of the voxel-level segmenter to, using image intensity values, a fully connected neural network, and a convolutional neural network, identify image features and produce a fully connected neural network model and a gradient boosting machine to classify the object in the region of interest and determine at least one feature related to the object; and
an output imager to output an indication of the object identified in the region of interest segmented in the image, the fully connected neural network model, and the gradient boosting machine.

2. The system of claim 1, wherein the third machine learning model includes at least one of a first deep learning model or a second deep learning model, and wherein the at least two models employed by the voxel-level segmenter include the first deep learning model to classify a target voxel and neighboring voxels and the second deep learning model to classify the target voxel and neighboring patches.

3. The system of claim 1, wherein the object includes an organ.

4. The system of claim 1, wherein the image includes a computed tomography image.

5. The system of claim 4, wherein the computed tomography image is a three-dimensional computed tomography image processed slice-by-slice to identify the object.

6. The system of claim 1, wherein the bounding box generator is to generate a first bounding box in an axial image slice, a second bounding box in a coronal image slice, and a third bounding box in a sagittal image slice and to generate the bounding box around the region of interest in a three-dimensional image by combining the first bounding box, the second bounding box, and the third bounding box.

7. The system of claim 6, wherein the bounding box generator is to be trained using a deep learning network and a database of positive and negative classification results including at least one rotated image slice, at least one translated image slice, and at least one duplicated image slice.

8. A non-transitory computer-readable storage medium including instructions which, when executed, cause a processor to at least implement a method of image processing comprising:
detecting an anatomy in an image using a first machine learning model to identify a region of interest in the anatomy or including the anatomy;
removing items not included in the anatomy from the image;
generating a bounding box around the region of interest using a second machine learning model and providing image data within the bounding box;
classifying image data within the bounding box at the voxel level using at least two models including a third machine learning model to identify an object in the region of interest;
combining a plurality of models including the at least two models to, using image intensity values, a fully connected neural network, and a convolutional neural network, identify image features and produce a fully connected neural network model and a gradient boosting machine to classify the object in the region of interest and determine at least one feature related to the object; and
outputting an indication of the object identified in the region of interest segmented in the image, the fully connected neural network model, and the gradient boosting machine.

9. The computer-readable storage medium of claim 8, wherein the third machine learning model includes at least one of a first deep learning model or a second deep learning model, and wherein the at least two models include the first deep learning model to classify a target voxel and neighboring voxels and the second deep learning model to classify the target voxel and neighboring patches.

10. The computer-readable storage medium of claim 8, wherein the object includes an organ.

11. The computer-readable storage medium of claim 8, wherein the image includes a computed tomography image.

12. The computer-readable storage medium of claim 11, wherein the computed tomography image is a three-dimensional computed tomography image processed slice-by-slice to identify the object.

13. The computer-readable storage medium of claim 8, wherein generating a bounding box around a region of interest in the anatomy further includes:
generating a first bounding box in an axial image slice, a second bounding box in a coronal image slice, and a third bounding box in a sagittal image slice; and
generating the bounding box around the region of interest in a three-dimensional image by combining the first bounding box, the second bounding box, and the third bounding box.

14. The computer-readable storage medium of claim 13, further including training at least one model using a deep learning network and a database of positive and negative classification results including at least one rotated image slice, at least one translated image slice, and at least one duplicated image slice.

15. A computer-implemented method of image processing comprising:
- detecting, using at least one processor, an anatomy in an image using a first machine learning model to identify a region of interest in the anatomy or including the anatomy;
- removing, using the at least one processor, items not included in the anatomy from the image;
- generating, using the at least one processor, a bounding box around the region of interest using a second machine learning model and providing image data within the bounding box;
- classifying, using the at least one processor, the image data within the bounding box at the voxel level using at least two models including a third machine learning model to identify an object in the region of interest;
- combining, using the at least one processor, a plurality of models including the at least two models to, using image intensity values, a fully connected neural network, and a convolutional neural network, identify image features and produce a fully connected neural network model and a gradient boosting machine to classify the object in the region of interest and determine at least one feature related to the object; and
- outputting, using the at least one processor, an indication of the object identified in the region of interest segmented in the image, the fully connected neural network model, and the gradient boosting machine.

* * * * *